(12) United States Patent
Kimura et al.

(10) Patent No.: US 12,222,020 B2
(45) Date of Patent: Feb. 11, 2025

(54) WRAPPED JOINED V-BELT

(71) Applicant: Mitsuboshi Belting Ltd., Kobe (JP)

(72) Inventors: Takeshi Kimura, Hyogo (JP); Yoshihito Nakaoji, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 711 days.

(21) Appl. No.: 17/254,636

(22) PCT Filed: May 29, 2019

(86) PCT No.: PCT/JP2019/021396
§ 371 (c)(1),
(2) Date: Dec. 21, 2020

(87) PCT Pub. No.: WO2020/003872
PCT Pub. Date: Jan. 2, 2020

(65) Prior Publication Data
US 2021/0148436 A1    May 20, 2021

(30) Foreign Application Priority Data

Jun. 25, 2018  (JP) .................................. 2018-119730
May 15, 2019  (JP) .................................. 2019-092308

(51) Int. Cl.
*F16G 5/08*       (2006.01)
*B32B 5/02*       (2006.01)
(Continued)

(52) U.S. Cl.
CPC ................ *F16G 5/08* (2013.01); *B32B 5/024* (2013.01); *B32B 25/042* (2013.01); *B32B 25/10* (2013.01);
(Continued)

(58) Field of Classification Search
CPC ..... F16G 5/08; F16G 5/20; F16G 5/22; B32B 5/024; B32B 25/042; B32B 25/10; B32B 25/04; B32B 5/24; C08L 11/00
(Continued)

(56) References Cited

U.S. PATENT DOCUMENTS 3,090,716 A * 5/1963 Stevens ..................... F16G 5/06
                                                    8/115.67
5,498,214 A * 3/1996 Macchiarulo .......... B29D 29/08
                                                    474/268
(Continued)

FOREIGN PATENT DOCUMENTS

CN      203641394 U *  6/2014
DE    112007002633 B4 *  3/2014 .............. C08L 21/00
(Continued)

OTHER PUBLICATIONS

Aug. 13, 2019—International Search Report—Intl App PCT/JP2019/021396.
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

The present invention relates to a wrapped joined V-belt in which outer peripheral surfaces of a plurality of wrapped V-belt portions are coupled via a tie band, each of the wrapped V-belt portions includes a tension member layer, a tension rubber layer laminated at a belt outer peripheral side, a compression rubber layer laminated at a belt inner peripheral side, and an outside cloth covering an entire outer surface of the belt, and the compression rubber layer includes a first compression rubber layer laminated at the belt outer peripheral side and a second compression rubber layer laminated at the belt inner peripheral side, a rubber
(Continued)

hardness of the tension rubber layer is higher than that of the second compression rubber layer, and a rubber hardness of the first compression rubber layer is equal to or higher than that of the tension rubber layer.

6 Claims, 2 Drawing Sheets

(51) Int. Cl.
    *B32B 25/04*     (2006.01)
    *B32B 25/10*     (2006.01)
    *B32B 25/18*     (2006.01)
    *C08L 11/00*     (2006.01)
    *F16G 5/20*     (2006.01)
    *F16G 5/22*     (2006.01)

(52) U.S. Cl.
    CPC .............. *B32B 25/18* (2013.01); *C08L 11/00* (2013.01); *F16G 5/20* (2013.01); *F16G 5/22* (2013.01); *B32B 2262/0276* (2013.01); *B32B 2262/062* (2013.01); *B32B 2262/14* (2013.01); *B32B 2307/536* (2013.01); *B32B 2307/54* (2013.01); *B32B 2433/04* (2013.01); *C08L 2205/03* (2013.01); *C08L 2205/06* (2013.01); *C08L 2205/16* (2013.01)

(58) Field of Classification Search
    USPC .......................... 474/238, 240, 245
    See application file for complete search history.

(56) References Cited

U.S. PATENT DOCUMENTS

| | | | | |
|---|---|---|---|---|
| 5,860,883 | A * | 1/1999 | Jonen | C08K 5/098 |
| | | | | 474/271 |
| 6,461,264 | B1 * | 10/2002 | Lofgren | F16G 5/06 |
| | | | | 474/263 |
| 8,475,309 | B2 * | 7/2013 | Di Meco | B32B 25/10 |
| | | | | 474/205 |
| 9,322,455 | B2 * | 4/2016 | Di Meco | F16G 1/28 |
| 9,873,593 | B2 * | 1/2018 | Papas | D07B 1/16 |
| 2008/0073156 | A1 * | 3/2008 | Ach | B29D 29/10 |
| | | | | 187/250 |
| 2010/0279808 | A1 * | 11/2010 | Fan | F16G 5/20 |
| | | | | 474/205 |
| 2011/0005675 | A1 * | 1/2011 | Burlett | C09J 175/04 |
| | | | | 427/389.9 |
| 2014/0243135 | A1 * | 8/2014 | Salmon | F16G 5/08 |
| | | | | 474/261 |
| 2015/0285334 | A1 * | 10/2015 | Thomas | F16G 5/20 |
| | | | | 474/90 |
| 2016/0333963 | A1 * | 11/2016 | South | F16G 5/06 |
| 2017/0023098 | A1 * | 1/2017 | Burlett | F16G 5/20 |
| 2018/0080527 | A1 * | 3/2018 | Imaoka | F16G 5/08 |

FOREIGN PATENT DOCUMENTS

| | | | | |
|---|---|---|---|---|
| EP | 0176686 | A2 * | 4/1986 | |
| EP | 3290743 | A1 * | 3/2018 | ............ B29C 66/45 |
| JP | S61-286637 | A | 12/1986 | |
| JP | S6267351 | A * | 3/1987 | |
| JP | H04-138143 | U | 12/1992 | |
| JP | H104-351350 | A | 12/1992 | |
| JP | H10-274290 | A | 10/1998 | |
| JP | 2001-241513 | A | 9/2001 | |
| JP | 2018058338 | A * | 4/2018 | |
| WO | WO-2011138862 | A1 * | 11/2011 | ............ F16G 5/06 |
| WO | 2014/178161 | A1 | 11/2014 | |
| WO | WO-2015122113 | A1 * | 8/2015 | ............ B29C 35/02 |
| WO | WO-2015128436 | A1 * | 9/2015 | ............ F16G 1/08 |
| WO | WO-2016175265 | A1 * | 11/2016 | ............ B29C 66/45 |
| WO | WO-2016194371 | A1 * | 12/2016 | ............ C08K 5/14 |
| WO | WO-2017168912 | A1 * | 10/2017 | ............ B32B 25/10 |

OTHER PUBLICATIONS

Jan. 11, 2022—(CA) Office Action—App. No. 3,100,307.
Aug. 16, 2022—(CA) Office Action—App. No. 3,100,307.
Mar. 11, 2022—(EP) Extended EP Search Report—EP App 19827351.8.

* cited by examiner

[FIG. 1]
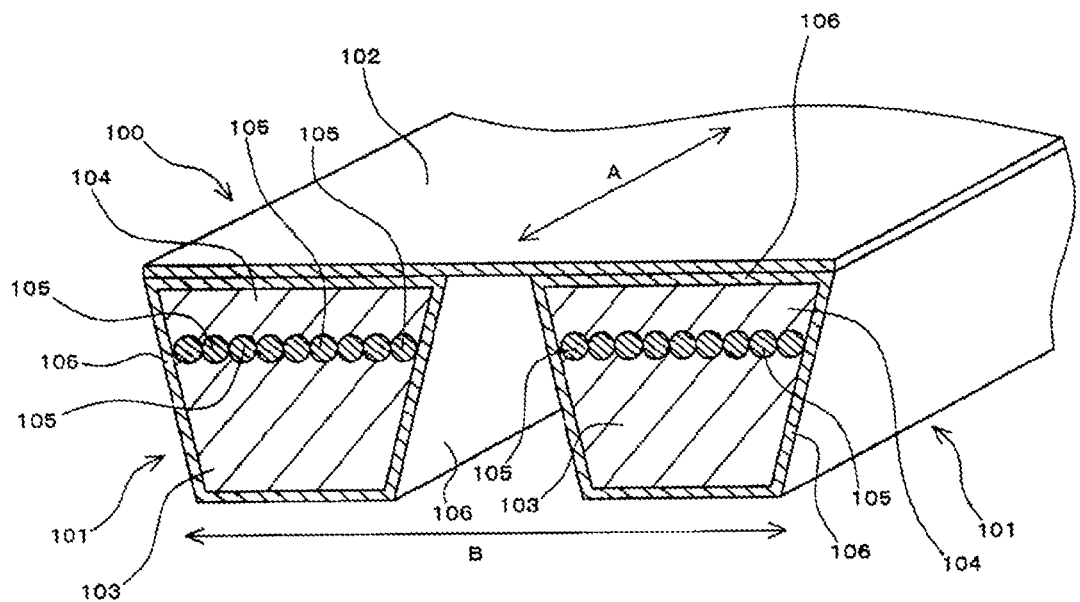
[FIG. 2]
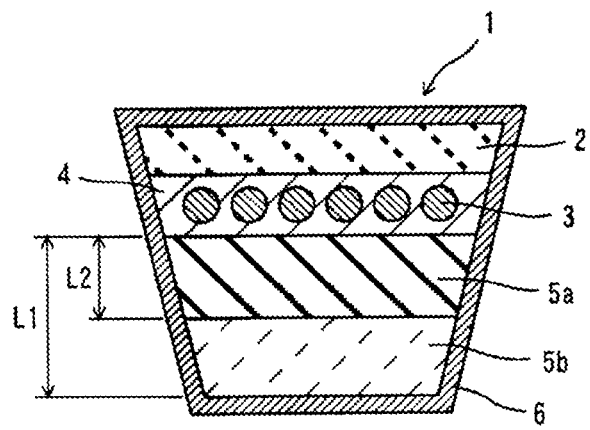
[FIG. 3]
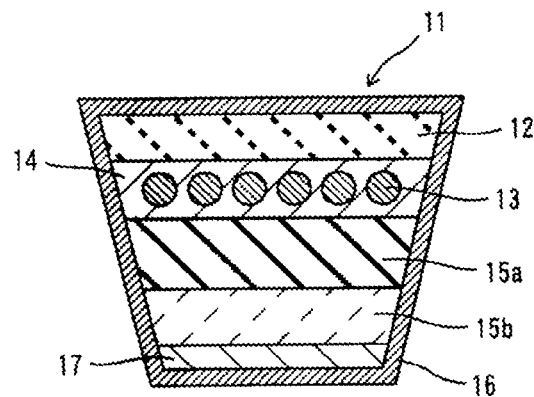

[FIG. 4]
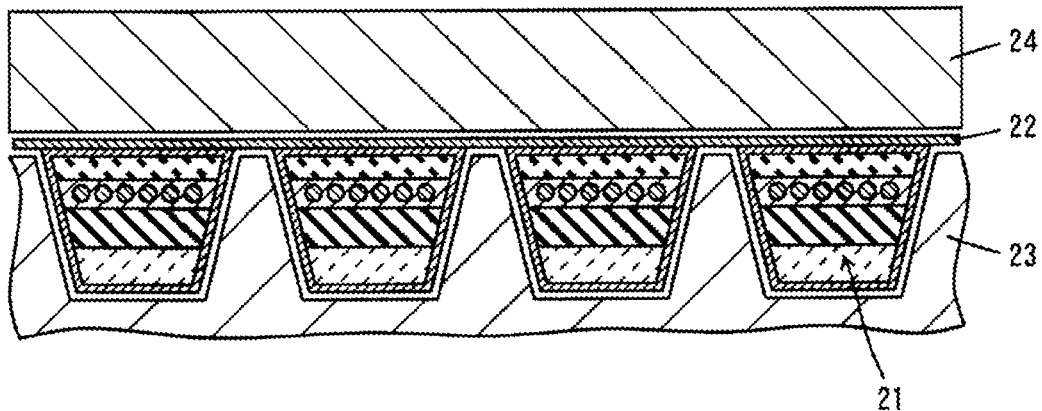
[FIG. 5]
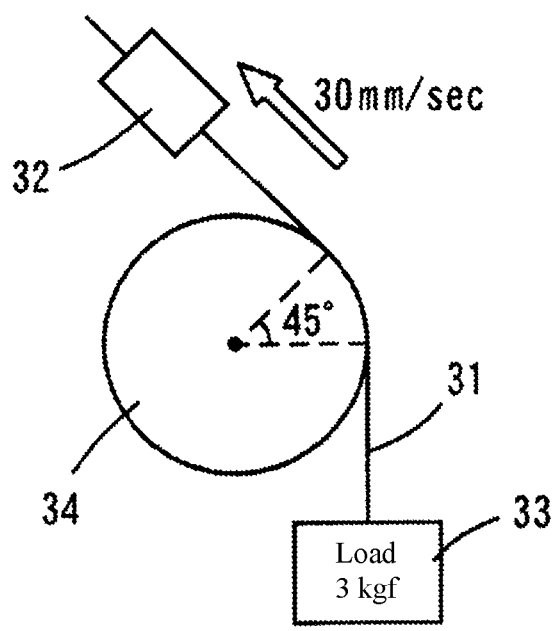
[FIG. 6]
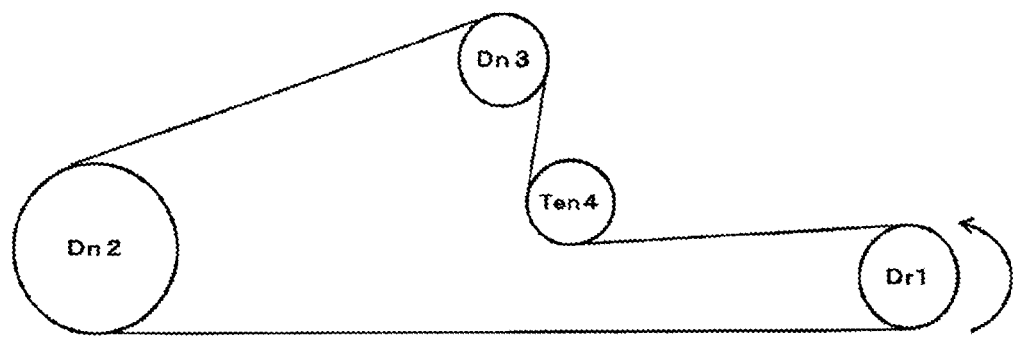

WRAPPED JOINED V-BELT

TECHNICAL FIELD

The present invention relates to a wrapped joined V-belt in which a plurality of V-belts are used at a time by winding around a pulley or the like in a high load and long span (long inter-shaft distance) layout such as large-scale agricultural machinery.

BACKGROUND ART

Examples of V-belts for transmitting power by frictional power transmission include a Raw-EDGE type (Raw-EDGE V-belt) whose frictional power transmission surface is an exposed rubber layer, and a wrapped type (wrapped V-belt) whose frictional power transmission surface (V-shaped side surface) is covered with a cover cloth, and they are used appropriately in accordance with the application due to a difference in surface properties of the frictional power transmission surface (coefficients of friction of the rubber layer and the cover cloth). These V-belts are used in a wide range of fields such as automobiles and industrial machines, and are used under high load due to an increase in power transmission capacity and an increase in size of the device. Therefore, in order to prevent buckling deformation (dishing), these V-belts are required to have increased rigidity (lateral pressure resistance) in a belt width direction.

For applications in which power can be transmitted with a single V-belt, only one of these V-belts is used. In contrast, for example, in an environment where a large amount of power is to be transmitted, such as large-scale agricultural machinery used in Europe and the United States, it is necessary to use a plurality of V-belts at the same time. That is, it is necessary to wind a plurality of V-belts around a pulley or the like of a rotation device in a state where the plurality of V-belts are arranged side by side, and to use the plurality of V-belts at the same time.

However, in the case where a plurality of V-belts are wound around the pulley or the like of the rotation device and used at the same time, a tension difference may occur between the belts, and stable power transmission may be impaired. Furthermore, adjacent belts come into contact with each other, and due to the contact, an overturn problem that an inner peripheral side and an outer peripheral side of the belt are turned upside down and inverted may occur. The inter-shaft distance between the pulleys around which the V-belts are wound is very long in the layout of large-scale agricultural machinery used in Europe and the United States. Therefore, during running, the V-belt easily swings greatly, and in the case where the lengths of a plurality of belts are uneven, the V-belt may be vibrated.

Here, in such a use environment, a joined belt configured by joining a plurality of annular belt portions each having a configuration similar to or corresponding to the above-described V-belt is used. This joined belt is configured as a V-belt in which outer peripheral sides of a plurality of belt portions are coupled and joined together by a joining member (reinforcing cloth) while the plurality of the belt portions are arranged in parallel.

Regarding the joined V-belt, for example, FIGS. 1 and 2 of JP-A-H10-274290 (Patent Literature 1) and FIG. 2 of JP-A-2001-241513 (Patent Literature 2) disclose a raw edge joined V-belt, and FIG. 1 of JP-A-H04-351350 (Patent Literature 3) discloses a wrapped joined V-belt. According to these joined V-belts, a large amount of power can be transmitted by a plurality of V-shaped protrusions while solving the above-mentioned problems that may occur when a plurality of V-belts are wound on pulleys.

In the above-mentioned application such as agricultural machinery, a wrapped V-belt in which the entire surface of the belt including the frictional power transmission surface is covered with a cover cloth is used. The reason is that, in the case where a Raw-EDGE V-belt whose frictional power transmission surface is an exposed rubber layer is used, the coefficient of friction of the power transmission surface is high and the stress applied to the belt becomes large, which may lead to early cutting, or when the belt entraps exhaust straw, stones, wood, or the like, sudden impact on the power transmission surface may damage the belt or the entire power transmission mechanism. In the case of using a wrapped V-belt, the coefficient of friction of the power transmission surface is reduced, and the stress or impact on the belt is reduced due to an appropriate slip. In addition, the power transmission surface is protected and is less likely to be damaged.

FIG. 1 is a schematic partial cross-sectional perspective view of a cut wrapped joined V-belt in which such wrapped V-belts are joined by a joining member (tie band). As illustrated in FIG. 1, the wrapped joined V-belt 100 includes two wrapped V-belts 101 arranged in parallel at an interval, and the two wrapped V-belts 101 have outer peripheral surfaces thereof coupled by a joining member 102 formed of a cloth. Each wrapped V-belt 101 is formed with an endless belt body including a tension rubber layer 104 at a belt outer peripheral side, a compression rubber layer 103 at a belt inner peripheral side, and tension members 105 embedded between the tension rubber layer 104 and the compression rubber layer 103 along a longitudinal direction (circumferential length direction, A direction in the figure) of the belt, and an outside cloth 106 (woven fabric, knitted fabric, non-woven cloth, etc.) covering the periphery of the belt body over the entire length in the circumferential length direction of the belt. In this example, the tension members 105 are cords (twisted cords) arranged at a predetermined interval in the belt width direction (B direction in the figure), are in contact with the tension rubber layer 104 and the compression rubber layer 103, and are interposed between the two layers.

Among the wrapped joined V-belts having such a structure, for a wrapped joined V-belt mainly used in large-scale agricultural machinery in Europe and the United States, improvement in lateral pressure resistance from the conventional wrapped joined V-belt is required in order to cope with a high load application of the device in recent years. In the high load application, buckling deformation (dishing) occurs due to lateral pressure from pulleys, and when the deformation is excessive, the shear stress generated from the inside of the V-belt may be concentrated near the tension member (in the case where an adhesion rubber layer including the tension member is formed, an interface between the tension member and the adhesion rubber layer or an interface between the adhesion rubber layer and the compression rubber layer) to cause interface separation, and further, the adhesive force between the tension member and the rubber may be reduced, leading to cord peeling. Furthermore, the deformation stress easily causes cracks on the side surface of the belt. Therefore, in order to prevent buckling deformation (dishing), the wrapped joined V-belt is required to have increased rigidity (lateral pressure resistance) in the belt width direction.

CITATION LIST

Patent Literature

Patent Literature 1: JP-A-H10-274290 (FIGS. 1 and 2)
Patent Literature 2: JP-A-2001-241513 (FIG. 2)
Patent Literature 3: JP-A-H04-351350 (FIG. 1)

SUMMARY OF INVENTION

Technical Problem

Therefore, an object of the present invention is to provide a wrapped joined V-belt capable of improving lateral pressure resistance.

Another object of the present invention is to provide a wrapped joined V-belt capable of preventing interface separation and cracks on the side surface due to buckling deformation and achieving stable running without belt inversion and/or overturn or coming off the pulley, even used in a high load and long span layout such as large-scale agricultural machinery.

Yet another object of the present invention is to provide a wrapped joined V-belt capable of achieving both bendability and lateral pressure resistance.

Solution to Problem

As a result of earnest study to achieve the above-mentioned problems, the present inventors have found that, in a wrapped joined V-belt having a plurality of wrapped V-belts, each of which includes a tension member layer including a tension member, a tension rubber layer laminated on the tension member layer at a belt outer peripheral side, a compression rubber layer laminated on the tension member layer at an inner peripheral side, and an outside cloth, joined together via a tie band, when forming the compression rubber layer to include a first compression rubber layer laminated at the belt outer peripheral side and a second compression rubber layer laminated at the belt inner peripheral side, adjusting the rubber hardness of the tension rubber layer to be higher than the rubber hardness of the second compression rubber layer, and adjusting the rubber hardness of the first compression rubber layer to be equal to or higher than the rubber hardness of the tension rubber layer, lateral pressure resistance can be improved. Based thereon, the present invention has been completed.

That is, a wrapped joined V-belt according to the present invention includes: a plurality of wrapped V-belt portions; and a tie band, in which outer peripheral surfaces of the wrapped V-belt portions are coupled via the tie band, each of the wrapped V-belt portions includes a tension member layer including a tension member, a tension rubber layer laminated on the tension member layer at a belt outer peripheral side, a compression rubber layer laminated on the tension member layer at a belt inner peripheral side, and an outside cloth covering an entire outer surface of the belt, and in each of the wrapped V-belt portions, the compression rubber layer includes a first compression rubber layer laminated at the belt outer peripheral side and a second compression rubber layer laminated at the belt inner peripheral side, the tension rubber layer has a rubber hardness that is higher than a rubber hardness of the second compression rubber layer, and the first compression rubber layer has a rubber hardness that is equal to or higher than the rubber hardness of the tension rubber layer. The rubber hardness of the first compression rubber layer may be higher than the rubber hardness of the tension rubber layer. In each of the wrapped V-belt portions, the first compression rubber layer may have an average thickness of from 90% to 50% with respect to an average thickness of the entire compression rubber layer. The tension rubber layer may have a rubber hardness Hs (JIS A) in the range of from 85 to 93, the first compression rubber layer may have a rubber hardness Hs (JIS A) in the range of from 90 to 95, and the second compression rubber layer may have a rubber hardness Hs (JIS A) in the range of from 72 to 80. A difference in the rubber hardness Hs (JIS A) between the first compression rubber layer and the second compression rubber layer may be from 12 to 20. A difference in rubber hardness Hs (JIS A) between the first compression rubber layer and the tension rubber layer may be from 0 to 10. The tension rubber layer may have a tensile elastic modulus (modulus) in a belt width direction in accordance with JIS K6251 (1993) being from 25 MPa to 50 MPa, the first compression rubber layer may have a tensile elastic modulus (modulus) in the belt width direction in accordance with JIS K6251 (1993) being from 25 MPa to 50 MPa, and the second compression rubber layer may have a tensile elastic modulus (modulus) in the belt width direction in accordance with JIS K6251 (1993) being from 12 MPa to 20 MPa. The outside cloth serving as a power transmission surface may have a coefficient of friction of from 0.91 to 0.96. A reinforcing cloth layer may be interposed between an inner peripheral surface of the compression rubber layer and the outside cloth. Each of the wrapped V-belt portions may have a width of the outer peripheral surface of the belt being from 15 mm to 35 mm, and a thickness of from 10 mm to 20 mm.

Advantageous Effects of Invention

In the present invention, in the wrapped joined V-belt having a plurality of wrapped V-belts, each of which includes a tension member layer including a tension member, a tension rubber layer laminated on the tension member layer at the belt outer peripheral side, a compression rubber layer laminated on the tension member layer at the inner peripheral side, and an outside cloth, joined together via a tie band, the compression rubber layer includes a first compression rubber layer laminated at the belt outer peripheral side and a second compression rubber layer laminated at the belt inner peripheral side, the rubber hardness of the tension rubber layer is adjusted to be higher than the rubber hardness of the second compression rubber layer, and the rubber hardness of the first compression rubber layer is adjusted to be equal to or higher than the rubber hardness of the tension rubber layer. Therefore, the lateral pressure resistance can be improved. Therefore, the wrapped joined V-belt according to the present invention can prevent interface separation and cracks on the side surface due to buckling deformation and achieve stable running without belt inversion and/or overturn or coming off the pulley, even used in a high load and long span layout such as large-scale agricultural machinery. Therefore, in the present invention, both bendability and lateral pressure resistance can be achieved.

BRIEF DESCRIPTION OF DRAWINGS

FIG. 1 is a schematic partial cross-sectional perspective view of a cut wrapped joined V-belt.

FIG. 2 is a schematic cross-sectional view of an example of a wrapped V-belt portion constituting a wrapped joined V-belt according to the present invention.

FIG. 3 is a schematic cross-sectional view of another example of the wrapped V-belt portion constituting the wrapped joined V-belt according to the present invention.

FIG. 4 is a schematic diagram for explaining a process of joining a plurality of unvulcanized wrapped V-belt portions via a tie band.

FIG. 5 is a schematic diagram for explaining a method of measuring a coefficient of friction in Examples.

FIG. 6 is a schematic diagram for explaining a running test of wrapped joined V-belts obtained in Examples and Comparative Examples.

DESCRIPTION OF EMBODIMENTS

Hereinafter, the present invention will be described in detail with reference to the accompanying drawings as necessary.

The wrapped joined V-belt according to the present invention may be a common wrapped joined V-belt, except that a compression rubber layer constituting each wrapped V-belt portion has a laminated structure including two types of compression rubber layers having different rubber hardness and the rubber hardness of each layer is adjusted.

The common wrapped joined V-belt may be, for example, a wrapped V-belt in which a plurality of wrapped V-belt portions are aligned in parallel with each other in a longitudinal direction and joined by laminating and integrating one tie band (joining member) on the outer peripheral surfaces of the wrapped V-belt portions. The number of the wrapped V-belt portions is not limited to 2 in FIG. 1, and may be 2 or more, for example, from 2 to 10, preferably from 2 to 8, and more preferably from 2 to 6. Adjacent wrapped V-belt portions only need to be aligned in parallel with each other in the longitudinal direction and are not limited to the embodiment of being arranged at an interval as illustrated in FIG. 1, and may be arranged without an interval. From the viewpoint of productivity or the like, it is preferable that the adjacent wrapped V-belt portions are arranged at an interval. The interval between adjacent wrapped V-belt portions is about, for example, from 1.7 mm to 4.3 mm, preferably from 2 mm to 4.1 mm, and more preferably from 2.3 mm to 3.9 mm. The tie band only needs to be able to join the wrapped V-belt portions, and is not limited to the embodiment in which the tie band is brought into contact with and integrated with the entire outer peripheral surface of each wrapped V-belt portion to join the wrapped V-belt portions as illustrated in FIG. 1, and may have a region where the outer peripheral surface of the wrapped V-belt portion is not in contact with the tie band. From the viewpoint of durability of the belt, it is preferable that the entire outer peripheral surface of each wrapped V-belt portion is brought into contact with and integrated with the tie band.

The wrapped V-belt portion may be a V-belt which includes, for example, a belt body having an endless V-shaped cross section and including a compression rubber layer at an inner peripheral side, a tension rubber layer at an outer peripheral side, and a tension member layer (adhesion rubber layer) interposed therebetween and embedded with a cord, and an outside cloth (cover cloth) covering a periphery of the V-shaped cross section of the belt body over the entire length in a circumferential length direction of the belt, and in which left and right side surfaces of the V-shaped cross section covered with the outside cloth serve frictional power transmission surfaces. In the V-shaped cross section, a side where the belt width is wide is the outer peripheral side, and a side where the belt width is narrow is the inner peripheral side.

FIG. 2 is a schematic cross-sectional view of an example of the wrapped V-belt portion constituting the wrapped joined V-belt according to the present invention (a view in which the tie band is omitted and only the wrapped V-belt portion has a close-up). A wrapped V-belt portion 1 illustrated in FIG. 2 includes an endless belt body in which a tension rubber layer 2, a tension member layer (adhesion rubber layer) 4 with tension members 3 embedded in a vulcanized rubber composition, a first compression rubber layer 5a, and a second compression rubber layer 5b are successively laminated from the belt outer peripheral side, and an outside cloth 6 (a woven fabric, a knitted fabric, a non-woven cloth, etc.) covering the periphery of the belt body over the entire length in the circumferential length direction of the belt. In this example, the tension members 3 are cords (twisted cords) arranged at a predetermined interval in the belt width direction. In addition, in this example, the tension member layer 4 is formed of a vulcanized rubber composition in which the tension members 3 are embedded. Alternatively, the tension member layer may be formed only of the tension members 3 arranged at an interface between the tension rubber layer and the compression rubber layer, as the embodiment illustrated in FIG. 1. In the present description and claims, in the case where the tension member layer is formed only of the tension member, tension members arranged at intervals in the belt body are called a tension member layer. Such a tension member layer not only includes a form in which the tension members are arranged at the interface between the tension rubber layer and the compression rubber layer, but also includes a form in which a part or all of the tension members arranged at the interface between the tension rubber layer and the compression rubber layer are embedded in the tension rubber layer or in the compression rubber layer during a production process.

The wrapped joined V-belt according to the present invention is a belt capable of achieving stable running even in a multi-shaft layout (a layout as illustrated in FIG. 5 in a belt running test of Examples to be described later) in which an inter-shaft distance between pulleys around which the V-belt is wound is very long and the V-belt easily swings greatly during running. That is, in a state where the wrapped joined V-belt is wound around each pulley and bent, the rubber layer at the outer peripheral side undergoes extension deformation and the rubber layer at the inner peripheral side undergoes compression deformation along with the bending. In the case where the wrapped joined V-belt is wound by reverse bending, the relationship between the outer peripheral side and the inner peripheral side is reversed. In any case, in the case where a rubber composition difficult to deform (extend or compress) is used for the rubber layer at the outer peripheral side or at the inner peripheral side, the bendability is lowered. As a result, winding property around the pulley is lowered and then, cracks easily occur in a portion largely undergoing the deformation stress. On the other hand, in the case where a flexible rubber composition which is easily deformed is used for giving priority to bendability (winding property) is used, lateral pressure resistance against the pulley is lowered. As a result, since the lowered lateral pressure resistance leads to an increase in the buckling deformation is increased, cracks easily occur at an interface between the tie band and the wrapped V-belt portion. From these viewpoints, in this application, the balance between bendability (winding property to the pulley) and lateral pressure resistance is important, and as a design concept, an important point is that the hardness and strength of a central layer (first compression rubber layer) in a thickness direction of the belt should be as high as possible, and the hardness of the tension rubber layer and the second compression rubber layer, which are layers at the outer peripheral side or the inner peripheral side, is adjusted within an appropriate range (not too high nor too low). In particular, it is difficult to balance the bendability and the lateral pressure resistance, which are contradictory properties. However, the present invention has succeeded in achieving both the bendability and the lateral pressure resistance by adjusting the rubber hardness of each layer.

The wrapped joined V-belt according to the present invention is preferably used in a high load and long span (long inter-shaft distance) layout such as large scale agricultural machinery. The width of the outer peripheral surface of the belt in each wrapped V-belt portion may be, for example, from 15 mm to 35 mm (particularly 16 mm to 25 mm), and the thickness of each wrapped V-belt portion may be, for example, from 10 mm to 20 mm (particularly 10 mm to 15 mm).

The entire belt length of the wrapped joined V-belt may be 200 inches (508 cm) or more, and for example, about from 220 inches to 500 inches.

Since the wrapped joined V-belt according to the present invention is suitable for a long span layout, the maximum span length (inter-shaft distance between the pulleys) may be 1,000 mm or more, and for example, about from 2,000 mm to 5,000 mm.

The wrapped joined V-belt according to the present invention is suitable for high load applications and is therefore suitable for high horsepower machines. The load (reference power transmission capacity) applied to one wrapped V-belt portion may be 10 PS or more, preferably 20 PS or more, and more preferably 22 PS or more (e.g., about from 22 PS to 30 PS).

[Compression Rubber Layer]

In the present invention, the compression rubber layer constituting each wrapped V-belt portion has a laminated structure of two or more layers including a first compression rubber layer laminated at the belt outer peripheral side and a second compression rubber layer laminated at the belt inner peripheral side and having a rubber hardness lower than that of the first compression rubber layer. Since the rubber hardness of the tension rubber layer is adjusted to be higher than the rubber hardness of the second compression rubber layer, and the rubber hardness of the first compression rubber layer is adjusted to be equal to or higher than the rubber hardness of the tension rubber layer, the lateral pressure resistance of the wrapped joined V-belt can be improved.

The compression rubber layer may have a laminated structure of three or more layers as long as it includes the first compression rubber layer and the second compression rubber layer, and preferably has a two-layer structure composed of the first compression rubber layer and the second compression rubber layer, from the viewpoints of lateral pressure resistance and productivity.

The rubber hardness of the first compression rubber layer is equal to or higher than the rubber hardness of the tension rubber layer, and a difference in rubber hardness Hs (JIS A) between the first compression rubber layer and the tension rubber layer (the rubber hardness of the first compression rubber layer—the rubber hardness of the tension rubber layer) may be 0 or more. The rubber hardness of the first compression rubber layer is preferably higher than the rubber hardness of the tension rubber layer. The difference in rubber hardness Hs (JIS A) between the first compression rubber layer and the tension rubber layer can be selected from the range of about, for example, from 0 to 10 from the viewpoint of achieving both the lateral pressure resistance and the bendability of the belt, and is preferably about from 0 to 7, more preferably from 0 to 5 (e.g., 0 to 4), and still more preferably from 0 to 3 (particularly 0 to 1) from the viewpoint of particularly improving the lateral pressure resistance of the belt. In the case where the difference in rubber hardness between the two layers is too large, the rubber hardness of the tension rubber layer is lowered, so that the lateral pressure resistance may be lowered.

The rubber hardness Hs of the first compression rubber layer can be selected from the range of about, for example, from 80 to 100, and is preferably about from 90 to 95, more preferably from 90 to 94, and still more preferably from 90 to 93 (particularly 92 to 93). In the case where the rubber hardness is too small, the lateral pressure resistance may be lowered, and in the case where the rubber hardness is too large, the hardness is too high, and the bendability of the belt such as a fitting property to the pulley groove may be lowered.

The rubber hardness Hs of the second compression rubber layer is smaller than the rubber hardness of both the first compression rubber layer and the tension rubber layer, and the difference in rubber hardness Hs between the first compression rubber layer and the second compression rubber layer (the rubber hardness of the first compression rubber layer—the rubber hardness of the second compression rubber layer) may be, for example, 1 or more (particularly 5 or more), and is preferably about from 5 to 30 (e.g., 7 to 27), more preferably from 10 to 25 (e.g., 12 to 20), still more preferably from 14 to 20 (particularly 15 to 19), and most preferably from 14 to 17 (particularly 15 to 17). The difference in rubber hardness Hs between the tension rubber layer and the second compression rubber layer (the rubber hardness of the tension rubber layer—the rubber hardness of the second compression rubber layer) can also be selected from the range same as the difference in rubber hardness Hs between the first compression rubber layer and the second compression rubber layer. In the case where the difference in rubber hardness between the second compression rubber layer and the first compression rubber layer or the tension rubber layer is too small, it is difficult to reduce the rubber hardness of the second compression rubber layer, and the bendability may be lowered.

The rubber hardness Hs of the second compression rubber layer can be selected from the range of about, for example, from 60 to 90, and is preferably about from 72 to 80, more preferably from 73 to 78, still more preferably from 74 to 78, and most preferably from 75 to 77. In the case where the rubber hardness is too small, the lateral pressure resistance may be lowered, and in the case where the rubber hardness is too large, the hardness is too high, and the bendability may be lowered.

In the present description and claims, the rubber hardness of each rubber layer indicates the value Hs (JIS A) measured in accordance with the spring hardness test (A type) specified in JIS K6253 (2012) (vulcanized rubber and thermoplastic rubber-hardness determination method-), and may be simply referred to as rubber hardness.

The tensile elastic modulus (modulus) of the first compression rubber layer is about, for example, from 25 MPa to 50 MPa, preferably from 25 MPa to 40 MPa, and more preferably from 26 MPa to 35 MPa (particularly 28 MPa to 32 MPa) in the belt width direction. In the case where the tensile elastic modulus is too small, the lateral pressure resistance may be lowered, and in the case where the tensile elastic modulus is too large, the hardness is too high, and the bendability may be lowered.

The tensile elastic modulus (modulus) of the second compression rubber layer is about, for example, from 12 MPa to 20 MPa, preferably from 13 MPa to 18 MPa, and more preferably from 14 MPa to 17 MPa in the belt width direction. In the case where the tensile elastic modulus is too small, the lateral pressure resistance may be lowered, and in the case where the tensile elastic modulus is too large, the hardness is too high, and the bendability may be lowered.

In the present description and claims, the tensile elastic modulus (modulus) of each rubber layer can be measured by a method in accordance with JIS K6251 (1993).

The average thickness of the entire compression rubber layer is about, for example, from 1 mm to 12 mm, preferably from 2 mm to 10 mm, and more preferably from 2.5 mm to 9 mm (particularly 3 mm to 5 mm).

The average thickness of the first compression rubber layer can be selected from the range of about, for example, from 95% to 30%, and is preferably about from 90% to 50%, more preferably from 85% to 55%, and still more preferably 80% to 60% (particularly 75% to 70%), with respect to the average thickness of the entire compression rubber layer. This proportion may be a proportion in the case where the compression rubber layer includes only the first compression rubber layer and the second compression rubber layer (i.e., L2/L1 in FIG. 2). In the case where the proportion of the thickness of the first compression rubber layer is too small, the lateral pressure resistance may be lowered, and in the case where the proportion is too large, the hardness is too high, and the bendability may be lowered.

The compression rubber layer may further contain another compression rubber layer having different rubber hardness in addition to the first compression rubber layer and the second compression rubber layer. The other compression rubber layer may be a single layer or a plurality of layers. The other compression rubber layer may be laminated on either an upper or lower surface of the first compression rubber layer or on a lower surface of the second compression rubber layer. The average thickness of the other compression rubber layer may be, for example, 30% or less, preferably 10% or less, and more preferably 5% or less, with respect to the average thickness of the entire compression rubber layer. That is, the compression rubber layer preferably includes the first compression rubber layer and the second compression rubber layer as main layers, and the total average thickness of the first compression rubber layer and the second compression rubber layer may be, for example, 70% or more, preferably 90% or more, and more preferably 95% or more with respect to the average thickness of the entire compression rubber layer. The compression rubber layer particularly preferably includes only the first compression rubber layer and the second compression rubber layer.

The compression rubber layer may be formed of a vulcanized rubber composition commonly used as a rubber composition of a wrapped V-belt. The vulcanized rubber composition may be a vulcanized rubber composition containing a rubber component, and when the composition of the vulcanized rubber composition is appropriately adjusted, it is possible to adjust the rubber hardness or the like of each layer constituting the compression rubber layer, particularly the first compression rubber layer and the second compression rubber layer. The method for adjusting the rubber hardness or the like is not particularly limited. The rubber hardness or the like may be adjusted by changing the composition and/or type of components constituting the vulcanized rubber composition, and is preferably adjusted by changing the proportion and/or type of short fibers and fillers, from the viewpoint of simplicity.

(First Compression Rubber Layer)
(A) Rubber Component

The rubber component constituting the vulcanized rubber composition forming the first compression rubber layer can be selected from known vulcanizable or crosslinkable rubbers and/or elastomers. Examples thereof include: diene rubbers (natural rubber, isoprene rubber, butadiene rubber, chloroprene rubber (CR), styrene butadiene rubber (SBR), vinyl pyridine-styrene-butadiene copolymer rubber, and acrylonitrile butadiene rubber (nitrile rubber); hydrogenated products of the above-mentioned diene rubbers such as hydrogenated nitrile rubber (including mixed polymer of hydrogenated nitrile rubber and an unsaturated carboxylic acid metal salt), etc.), olefin rubbers (e.g., ethylene-α-olefin rubber (ethylene-α-olefin elastomer), polyoctenylene rubber, ethylene-vinyl acetate copolymer rubber, chlorosulfonated polyethylene rubber, alkylated chlorosulfonated polyethylene rubber, etc.), epichlorohydrin rubber, acrylic rubber, silicone rubber, urethane rubber, fluororubber, and the like. These rubber components can be used alone or in combination of two or more thereof.

Among these, from the viewpoint that a vulcanizing agent and a vulcanization accelerator easily disperse, ethylene-α-olefin elastomers (ethylene-α-olefin rubbers such as ethylene-propylene copolymer (EPM) and ethylene-propylene-diene terpolymer (EPDM)) and chloroprene rubber are widely used. In particular, in the case of being used in a high load environment such as a variable speed belt, chloroprene rubber and EPDM are preferred from the viewpoint of excellent balance of mechanical strength, weather resistance, heat resistance, cold resistance, oil resistance, adhesiveness and the like. Furthermore, chloroprene rubber is particularly preferred because of having excellent abrasion resistance in addition to the above-mentioned properties. The chloroprene rubber may be a sulfur-modified type or a non-sulfur-modified type.

In the case where the rubber component contains chloroprene rubber, the proportion of the chloroprene rubber in the rubber component may be, for example, 50% by mass or more (particularly from about 80 to 100% by mass), and particularly preferably 100% by mass (chloroprene rubber only).

(B) Short Fibers

The vulcanized rubber composition may further contain short fibers in addition to the rubber component. Examples of the short fibers include: synthetic fibers such as polyolefin fibers (e.g., a polyethylene fiber and a polypropylene fiber), polyamide fibers (e.g., a polyamide 6 fiber, a polyamide 66 fiber, a polyamide 46 fiber, and an aramid fiber), polyalkylene arylate fibers (e.g., $C_{2-4}$ alkylene $C_{8-14}$ arylate fibers such as a polyethylene terephthalate (PET) fiber, a polytrimethylene terephthalate (PTT) fiber, a polybutylene terephthalate (PBT) fiber, and a polyethylene naphthalate (PEN) fiber), vinylon fibers, polyvinyl alcohol fibers, and polyparaphenylene benzobisoxazole (PBO) fibers; natural fibers such as cotton, hemp and wool; inorganic fibers such as carbon fibers; and the like. These short fibers can be used alone or in combination of two or more thereof.

Among these short fibers, synthetic fibers and natural fibers, particularly synthetic fibers such as polyester fibers (polyalkylene arylate fibers) containing, as a main constituent unit, $C_{2-4}$ alkylene $C_{6-12}$ arylates such as ethylene terephthalate and ethylene-2,6-naphthalate and polyamide fibers (an aramid fiber, etc.), and inorganic fibers such as a carbon fiber are widely used. Among these, preferred are rigid, high strength and modulus fibers such as polyester fibers (particularly a polyethylene terephthalate fiber and a polyethylene naphthalate fiber) and polyamide fibers (particularly an aramid fiber). The aramid fiber also has high abrasion resistance. Therefore, the short fibers preferably contain at least wholly aromatic polyamide fibers such as an aramid fiber. The aramid fiber may be a commercially available product such as trade name "Conex", "Nomex", "Kevlar", "Technora", "Twaron".

The average fiber diameter of the short fibers is about, for example, 2 μm or more, preferably from 2 μm to 100 μm, more preferably from 3 μm to 50 μm (e.g., 5 μm to 50 μm), and still more preferably from 7 μm to 40 μm (particularly 10 μm to 30 μm). The average length of the short fibers is about, for example, from 1 mm to 20 mm, preferably from 1.5 mm to 10 mm, and more preferably from 2 mm to 5 mm (particularly 2.5 mm to 4 mm).

From the viewpoint of dispersibility and adhesiveness of the short fibers in the rubber composition, the short fibers may be subjected to an adhesion treatment (or surface treatment) by a common method. Examples of the surface treatment method include a method of treating with a treatment liquid containing a common surface treatment agent. Examples of the surface treatment agent include an RFL liquid containing resorcin (R), formaldehyde (F) and rubber or latex (L) (e.g., an RFL liquid containing a condensate (RF condensate) formed by resorcin (R) and formaldehyde (F), and the above-described rubber component such as vinylpyridine-styrene-butadiene copolymer rubber), an epoxy compound, a polyisocyanate compound, a silane coupling agent, a vulcanizable rubber composition (e.g., a vulcanizable rubber composition containing a wet-process white carbon that has a surface silanol group and contains hydrated silicic acid as a main component, which is advantageous for enhancing chemical bonding force with rubber, and the like, etc.), and the like. These surface treatment agents may be used alone or in combination of two or more thereof, and short fibers may be sequentially treated with the same or different surface treatment agents for a plurality of times.

The short fibers may be embedded in the compression rubber layer while being oriented in the belt width direction in order to suppress the compression deformation of the belt due to the pressure from the pulley.

The proportion of the short fibers is about, for example, from 5 to 50 parts by mass, preferably from 10 to 30 parts by mass, and more preferably from 15 to 25 parts by mass (particularly 18 to 22 parts by mass), with respect to 100 parts by mass of the rubber component. In the case where the proportion of the short fibers is too small, the rubber hardness of the first compression rubber layer may be lowered, and in the case where the proportion is too large, the hardness is too high, and the bendability may be lowered.

(C) Filler

The vulcanized rubber composition may further contain a filler in addition to the rubber component. Examples of the filler include carbon black, silica, clay, calcium carbonate, talc, mica, and the like. The filler often contains a reinforcing filler, and such a reinforcing filler may be carbon black, reinforcing silica or the like. Generally, the reinforcing ability of silica is smaller than that of carbon black. These fillers can be used alone or in combination of two or more thereof. In the present invention, in order to improve the lateral pressure resistance, it is preferable to contain a reinforcing filler, and it is particularly preferable to contain carbon black.

The average particle diameter (number average primary particle diameter) of carbon black is about, for example, from 5 nm to 200 nm, preferably from 10 nm to 150 nm, and more preferably from 15 nm to 100 nm, and from the viewpoint of a high reinforcing effect, may be small, for example, about from 5 nm to 38 nm, preferably from 10 nm to 35 nm, and more preferably from 15 nm to 30 nm. Examples of the small-particle-diameter carbon black include SAF, ISAF-HM, ISAF-LM, HAF-LS, HAF, HAF-HS, and the like. The above carbon black can be used alone or in combination of two or more thereof.

In the present invention, since the deterioration in workability can be prevented even when a large amount of carbon black is blended, the mechanical properties (elastic modulus) of the first compression rubber layer can be improved. Furthermore, the carbon black can reduce the coefficient of friction of the first compression rubber layer and can improve the abrasion resistance of the first compression rubber layer.

The proportion of the filler (particularly carbon black) may be about, for example, from 10 to 100 parts by mass, preferably from 20 to 80 parts by mass, and more preferably from 30 to 70 parts by mass (particularly 40 to 60 parts by mass), with respect to 100 parts by mass of the rubber component. In the case where the proportion of the filler is too small, the elastic modulus may be insufficient and the lateral pressure resistance and durability may be lowered, and in the case where the proportion is too large, the elastic modulus is too high, and the bendability may be lowered.

The proportion of carbon black is, for example, 50% by mass or more, preferably 80% by mass or more, more preferably 90% by mass or more, and may be 100% by mass, with respect to the total filler. In the case where the proportion of carbon black with respect to the total filler is too small, the rubber hardness of the first compression rubber layer may be lowered.

(D) Other Additives

The vulcanized rubber composition may contain, if necessary, a vulcanizing agent or cross-linking agent, co-cross-linking agent, an auxiliary vulcanizing agent, a vulcanization accelerator, a vulcanization retardant, metal oxides (calcium oxide, barium oxide, iron oxide, copper oxide, titanium oxide, aluminum oxide, etc.), softeners (oils such as paraffin oil and naphthenic oil, etc.), processing agents or processing aids (e.g., fatty acids such as stearic acid, fatty acid metal salts such as stearic acid metal salts, fatty acid amides such as stearic acid amide, wax, paraffin, etc.), adhesiveness improving agents (e.g., a resorcin-formaldehyde co-condensate (RF condensate), an amino resin (a condensate of a nitrogen-containing cyclic compound and formaldehyde, for example, melamine resins such as hexamethylolmelamine and hexaalkoxymethylmelamine (hexamethoxymethylmelamine, hexabutoxymethylmelamine, etc.), urea resins such as methylolurea, benzoguanamine resins such as a methylolbenzoguanamine resin, etc.), a co-condensate of them (a resorcin-melamine-formaldehyde co-condensate, etc.), etc.), anti-aging agents (an antioxidant, an anti-heat-aging agent, an anti-flex-cracking agent, an antiozonant, etc.), a colorant, a tackifier, a plasticizer, a lubricant, coupling agents (a silane coupling agent, etc.), stabilizers (a UV absorber, a heat stabilizer, etc.), a flame retardant, an antistatic agent, and the like. The metal oxides may function as cross-linking agents. In the adhesiveness improving agent, the resorcin-formaldehyde co-condensate and the amino resin may be an initial condensate (prepolymer) of a nitrogen-containing cyclic compound such as resorcin and/or melamine and formaldehyde.

As the vulcanizing agent or cross-linking agent, common components can be used depending on the type of the rubber component, and examples thereof include metal oxide vulcanizing agents (magnesium oxide, zinc oxide, lead oxide, etc.), organic peroxides (diacyl peroxide, peroxyester, dialkyl peroxide, etc.), sulfur-based vulcanizing agents, and the like. Examples of the sulfur-based vulcanizing agents include powdered sulfur, precipitated sulfur, colloidal sulfur, insoluble sulfur, highly dispersible sulfur, sulfur chlorides (sulfur monochloride, sulfur dichloride, etc.), and the like. These cross-linking agents or vulcanizing agents can be used alone or in combination of two or more thereof. In the case where the rubber component is chloroprene rubber, a metal oxide (magnesium oxide, zinc oxide, etc.) may be used as the vulcanizing agent or cross-linking agent. The metal oxide may be used in combination with another vulcanizing agent (a sulfur-based vulcanizing agent, etc.), and the metal oxide and/or the sulfur-based vulcanizing agent may be used alone or in combination with a vulcanization accelerator.

The proportion of the vulcanizing agent can be selected from the range of, for example, from about 1 to 20 parts by mass in terms of solid content, with respect to 100 parts by mass of the rubber component, depending on the types of the vulcanizing agent and the rubber component. For example, the proportion of the metal oxide as the vulcanizing agent is about, for example, from 1 to 20 parts by mass, preferably from 3 to 17 parts by mass, and more preferably from 5 to 15 parts by mass (particularly 7 to 13 parts by mass), with respect to 100 parts by mass of the rubber component. In the case of combining the metal oxide and the sulfur-based vulcanizing agent, the proportion of the sulfur-based vulcanizing agent is about, for example, from 0.1 to 50 parts by mass, preferably from 1 to 30 parts by mass, and more preferably from 3 to 10 parts by mass, with respect to 100 parts by mass of the metal oxide. The proportion of an organic peroxide is about, for example, from 1 to 8 parts by mass, preferably from 1.5 to 5 parts by mass, and more preferably from 2 to 4.5 parts by mass, with respect to 100 parts by mass of the rubber component.

Examples of the co-cross-linking agent (cross-linking aid or co-vulcanizing agent) include known cross-linking aids, for example, polyfunctional (iso)cyanurates (e.g., triallyl isocyanurate (TAIC), triallyl cyanurate (TAC), etc.); polydienes (e.g., 1,2-polybutadiene, etc.); metal salts of unsaturated carboxylic acids (e.g., polyvalent metal salts of (meth)acrylic acid such as zinc (meth)acrylate and magnesium (meth)acrylate); oximes (e.g., quinonedioxime, etc.); guanidines (e.g., diphenylguanidine, etc.); polyfunctional (meth)acrylates (e.g., alkanediol di(meth)acrylates such as ethylene glycol di(meth)acrylate and butanediol di(meth)acrylate, and alkanepolyol poly(meth)acrylates such as trimethylolpropane tri(meth)acrylate and pentaerythritol tetra(meth)acrylate); and bismaleimides (aliphatic bismaleimides such as alkylene bismaleimides such as N,N'-1,2-ethylenedimaleimide, N,N'-hexamethylene bismaleimide, and 1,6'-bismaleimide-(2,2,4-trimethyl)cyclohexane; arene bismaleimides or aromatic bismaleimides such as N,N'-m-phenylene dimaleimide, 4-methyl-1,3-phenylenedimaleimide, 4,4'-diphenylmethanedimaleimide, 2,2-bis[4-(4-maleimidophenoxy)phenyl]propane, 4,4'-diphenyl ether dimaleimide, 4,4'-diphenyl sulfone dimaleimide, and 1,3-bis(3-maleimidophenoxy)benzene; etc.); and the like. These cross-linking aids can be used alone or in combination of two or more thereof. Among these cross-linking aids, preferred are polyfunctional (iso)cyanurates, polyfunctional (meth)acrylates, bismaleimides (arene bismaleimides or aromatic bismaleimides such as N,N'-m-phenylene dimaleimide). Bismaleimides are often used. Addition of the cross-linking aid (e.g., bismaleimides) can increase the degree of cross-linking and can prevent adhesion abrasion.

The proportion of the co-cross-linking agent (cross-linking aid) such as bismaleimides is about, for example, from 0.1 to 10 parts by mass, preferably from 0.5 to 8 parts by mass, and more preferably from 1 to 5 parts by mass (particularly 2 to 4 parts by mass) in terms of solid content, with respect to 100 parts by mass of the rubber component.

Examples of the vulcanization accelerator include: thiuram accelerators (e.g., tetramethylthiuram monosulfide (TMTM), tetramethylthiuram disulfide (TMTD), tetraethyl thiuram disulfide (TETD), tetrabutyl thiuram disulfide (TBTD), dipentamethylene thiuram tetrasulfide (DPTT), N,N'-dimethyl-N,N'-diphenylthiuram disulfide, etc.); thiazole accelerators (e.g., 2-mercaptobenzothiazole, a zinc salt of 2-mercaptobenzothiazole, 2-mercaptothiazoline, dibenzothiazyl disulfide, 2-(4'-morpholinodithio)benzothiazole, etc.); sulfenamide accelerators (e.g., N-cyclohexyl-2-benzothiazylsulfenamide (CBS), N,N'-dicyclohexyl-2-benzothiazylsulfenamide, etc.); guanidines (diphenylguanidine, di-o-tolylguanidine, etc.); urea-based or thiourea-based accelerators (e.g., ethylenethiourea, etc.); dithiocarbamates; xanthates; and the like. These vulcanization accelerators can be used alone or in combination of two or more thereof. Among the vulcanization accelerators, TMTD, DPTT, CBS, and the like are widely used.

The proportion of the vulcanization accelerator is about, for example, from 0.1 to 15 parts by mass, preferably from 0.3 to 10 parts by mass (e.g., 0.5 to 5 parts by mass), and more preferably from 0.5 to 3 parts by mass (particularly 0.5 to 1.5 parts by mass) in terms of solid content, with respect to 100 parts by mass of the rubber component.

The proportion of the softener (oils such as naphthenic oil) is about, for example, from 1 to 30 parts by mass, preferably from 3 to 20 parts by mass, and more preferably from 3 to 10 parts by mass (particularly 3 to 8 parts by mass) in terms of solid content, with respect to 100 parts by mass of the rubber component.

The proportion of the processing agent or processing aid (stearic acid, etc.) is about, for example, 10 parts by mass or less (e.g., 0 to 10 parts by mass), preferably from 0.1 to 5 parts by mass (e.g., 0.5 to 3 parts by mass), and more preferably from 1 to 3 parts by mass (particularly 1.5 to 2.5 parts by mass) in terms of solid content, with respect to 100 parts by mass of the rubber component.

The proportion of the adhesiveness improving agent (a resorcin-formaldehyde co-condensate, hexamethoxymethylmelamine, etc.) is about, for example, from 0.1 to 20 parts by mass (e.g., 0.2 to 10 parts by mass), preferably from 0.3 to 5 parts by mass (e.g., 0.5 to 2.5 parts by mass), and more preferably from 0.5 to 3 parts by mass (particularly 0.5 to 1.5 parts by mass) in terms of solid content, with respect to 100 parts by mass of the rubber component.

The proportion of the anti-aging agent is about, for example, from 0.5 to 15 parts by mass, preferably from 1 to 10 parts by mass, and more preferably from 2.5 to 7.5 parts by mass (particularly 3 to 7 parts by mass) in terms of solid content, with respect to 100 parts by mass of the rubber component.

(Second Compression Rubber Layer)

As a rubber component constituting a vulcanized rubber composition forming the second compression rubber layer, the rubber components exemplified as the rubber component (A) of the first compression rubber layer can be used, and descriptions of preferred forms are also the same as those of the rubber component (A) of the first compression rubber layer.

The vulcanized rubber composition of the second compression rubber layer may further contain a filler in addition to the rubber component. As the filler, the fillers exemplified as the filler (C) of the first compression rubber layer can be used, and descriptions of preferred forms and the proportion of carbon black in the filler are the same as those of the filler (C) of the first compression rubber layer.

In the second compression rubber layer, the proportion of the filler (particularly carbon black) is about, for example, from 5 to 80 parts by mass, preferably from 10 to 60 parts by mass, and more preferably from 15 to 50 parts by mass (particularly 20 to 40 parts by mass), with respect to 100 parts by mass of the rubber component. In the case where the proportion of the filler is too small, the elastic modulus may be insufficient and the lateral pressure resistance and durability may be lowered, and in the case where the proportion is too large, the elastic modulus is too high, and the bendability may be lowered.

The vulcanized rubber composition of the second compression rubber layer may further contain a plasticizer in addition to the rubber component. Examples of the plasticizer include aliphatic carboxylic acid plasticizers (an adipic acid ester plasticizer, a sebacic acid ester plasticizer, etc.), aromatic carboxylic acid ester plasticizers (a phthalic acid ester plasticizer, a trimellitic acid ester plasticizer, etc.), an oxycarboxylic acid ester plasticizer, a phosphoric acid ester plasticizer, an ether plasticizer, an ether ester plasticizer, and the like. These plasticizers can be used alone or in combination of two or more thereof. Among these, an ether ester plasticizer is preferred.

The proportion of the plasticizer is about, for example, from 1 to 30 parts by mass, preferably from 3 to 20 parts by mass, and more preferably from 3 to 10 parts by mass (particularly 3 to 8 parts by mass), with respect to 100 parts by mass of the rubber component.

The vulcanized rubber composition of the second compression rubber layer may further contain short fibers and other additives in addition to the rubber component. As the short fibers, the short fibers exemplified as the short fibers (B) of the first compression rubber layer can be used, and as the other additives, the additives exemplified as the other additives (D) of the first compression rubber layer can be used. Among these, the second compression rubber layer preferably contains a vulcanizing agent or cross-linking agent, a vulcanization accelerator, a processing agent or processing aid, and an anti-aging agent in addition to the rubber component.

The proportion of the metal oxide as the vulcanizing agent is about, for example, from 1 to 20 parts by mass, preferably from 3 to 17 parts by mass, and more preferably from 5 to 15 parts by mass (particularly 7 to 13 parts by mass), with respect to 100 parts by mass of the rubber component.

The proportion of the vulcanization accelerator is about, for example, from 0.1 to 15 parts by mass, preferably from 0.3 to 10 parts by mass (e.g., 0.5 to 5 parts by mass), and more preferably from 0.5 to 3 parts by mass (particularly 0.5 to 1.5 parts by mass) in terms of solid content, with respect to 100 parts by mass of the rubber component.

The proportion of the processing agent or processing aid (stearic acid, etc.) is about, for example, 10 parts by mass or less (e.g., 0 to 5 parts by mass), preferably from 0.1 to 3 parts by mass, and more preferably from 0.3 to 2 parts by mass (particularly 0.5 to 1.5 parts by mass), with respect to 100 parts by mass of the rubber component.

The proportion of the anti-aging agent is about, for example, from 0.5 to 15 parts by mass, preferably from 1 to 10 parts by mass, and more preferably from 2.5 to 7.5 parts by mass (particularly 3 to 7 parts by mass), with respect to 100 parts by mass of the rubber component.

[Tension Rubber Layer]

As described above, the rubber hardness of the tension rubber layer is higher than the rubber hardness of the second compression rubber layer and is equal to or lower than the rubber hardness of the first compression rubber layer.

The rubber hardness Hs of the tension rubber layer can be selected from the range of, for example, from about 75 to 95, and is about, for example, from 80 to 94 (e.g., 85 to 93), preferably from 88 to 93, and more preferably from 90 to 93 (particularly 92 to 93). In the case where the rubber hardness is too small, the lateral pressure resistance may be lowered, and in the case where the rubber hardness is too large, the hardness is too high, and the bendability may be lowered.

The tensile elastic modulus (modulus) of the tension rubber layer is about, for example, from 25 MPa to 50 MPa, preferably from 25 MPa to 40 MPa, and more preferably from 26 MPa to 35 MPa (particularly 28 MPa to 32 MPa) in the belt width direction. In the case where the tensile elastic modulus is too small, the lateral pressure resistance may be lowered, and in the case where the tensile elastic modulus is too large, the hardness is too high, and the bendability may be lowered.

The average thickness of the tension rubber layer may be about, for example, from 0.5 mm to 10 mm (e.g., 0.5 mm to 1.5 mm), preferably from 0.6 mm to 5 mm, and more preferably from 0.7 mm to 3 mm (particularly 0.8 mm to 1 mm).

The tension rubber layer may be formed of a vulcanized rubber composition commonly used as the rubber composition of a wrapped V-belt. The vulcanized rubber composition may be a vulcanized rubber composition containing a rubber component, and when the composition of the vulcanized rubber composition is appropriately adjusted, it is possible to adjust the rubber hardness or the like of the tension rubber layer. The method for adjusting the rubber hardness or the like is not particularly limited. The rubber hardness or the like may be adjusted by changing the composition and/or type of components constituting the vulcanized rubber composition, and is preferably adjusted by changing the proportion and/or type of short fibers and fillers, from the viewpoint of simplicity.

As a rubber component constituting a vulcanized rubber composition forming the tension rubber layer, the rubber components exemplified as the rubber component (A) of the first compression rubber layer can be used, and descriptions of preferred forms are also the same as those of the rubber component (A) of the first compression rubber layer.

The vulcanized rubber composition of the tension rubber layer may further contain short fibers in addition to the rubber component. As the short fibers, the short fibers exemplified as the short fibers (B) of the first compression rubber layer can be used, and descriptions of preferred forms and the proportion with respect to the rubber component are the same as those of the short fibers (B) of the first compression rubber layer.

The vulcanized rubber composition of the tension rubber layer may further contain a filler. As the filler, the fillers exemplified as the filler (C) of the first compression rubber layer can be used, and descriptions of preferred forms and the proportion of carbon black in the filler are the same as those of the filler (C) of the first compression rubber layer.

In the tension rubber layer, the proportion of the filler (particularly carbon black) is about, for example, from 5 to 100 parts by mass, preferably from 10 to 80 parts by mass, and more preferably from 20 to 60 parts by mass (particularly 30 to 50 parts by mass), with respect to 100 parts by mass of the rubber component. In the case where the proportion of the filler is too small, the elastic modulus may be insufficient and the lateral pressure resistance and durability may be lowered, and in the case where the proportion is too large, the elastic modulus is too high, and the bendability may be lowered.

The vulcanized rubber composition of the tension rubber layer may further contain other additives in addition to the rubber component. As the other additives, the other additives exemplified as the other additives (D) of the first compression rubber layer can be used, and descriptions of preferred forms and the proportion with respect to the rubber component are the same as those of the other additives (D) of the first compression rubber layer.

[Tension Member Layer]

The tension member layer needs only include the tension member, and may be a tension member layer formed of only the tension member, as described above. A tension member layer (adhesion rubber layer) formed of a vulcanized rubber composition embedded with a tension member is preferred from the viewpoint of preventing separation between layers and improving durability of the belt. The tension member layer formed of a vulcanized rubber composition embedded with a tension member is generally called an adhesion rubber layer, and the tension member is embedded in a layer formed of the vulcanized rubber composition containing a rubber component. The adhesion rubber layer is interposed between the tension rubber layer and the compression rubber layer (particularly the first compression rubber layer) to adhere the tension rubber layer and the compression rubber layer, and the tension member is embedded in the adhesion rubber layer.

The average thickness of the adhesion rubber layer is about, for example, from 0.2 mm to 5 mm, preferably from 0.3 mm to 3 mm, and more preferably from 0.3 mm to 2 mm (particularly 0.5 mm to 1.5 mm).

(Vulcanized Rubber Composition)

The rubber hardness Hs of the vulcanized rubber composition forming the adhesion rubber layer is about, for example, from 72 to 80, preferably from 73 to 78, and more preferably from 75 to 77. In the case where the rubber hardness is too small, the lateral pressure resistance may be lowered, and in the case where the rubber hardness is too large, the vulcanized rubber composition around the tension member becomes rigid, making the tension member less likely to bend, causing deterioration of the adhesion rubber layer due to heat generation (cracks), bending fatigue of the tension member, and the like, and thus causing separation of the tension member in some cases.

As a rubber component constituting the vulcanized rubber composition forming the adhesion rubber layer, the rubber components exemplified as the rubber component (A) of the first compression rubber layer can be used, and descriptions of preferred forms are also the same as those of the rubber component (A) of the first compression rubber layer.

The vulcanized rubber composition of the adhesion rubber layer may further contain a filler in addition to the rubber component. As the filler, the fillers exemplified as the filler (C) of the first compression rubber layer can be used, and descriptions of preferred forms and the proportion of carbon black in the filler are the same as those of the filler (C) of the first compression rubber layer.

In the adhesion rubber layer, the proportion of the filler is about, for example, from 1 to 100 parts by mass, preferably from 10 to 80 parts by mass, and more preferably from 30 to 70 parts by mass (particularly 40 to 60 parts by mass), with respect to 100 parts by mass of the rubber component. The proportion of carbon black is about, for example, from 1 to 50 parts by mass, preferably from 10 to 45 parts by mass, and more preferably from 20 to 40 parts by mass, with respect to 100 parts by mass of the rubber component.

The vulcanized rubber composition of the adhesion rubber layer may further contain a plasticizer in addition to the rubber component. As the plasticizer, the plasticizers exemplified as the plasticizer of the second compression rubber layer can be used, and descriptions of preferred forms and the proportion with respect to the rubber component are the same as those of the plasticizer of the second compression rubber layer.

The vulcanized rubber composition of the adhesion rubber layer may further contain short fibers and other additives in addition to the rubber component. As the short fibers, the short fibers exemplified as the short fibers (B) of the first compression rubber layer can be used, and as the other additives, the additives exemplified as the other additives (D) of the first compression rubber layer can be used. Among these, the adhesion rubber layer preferably contains a vulcanizing agent or cross-linking agent, a vulcanization accelerator, a processing agent or processing aid, and an anti-aging agent in addition to the rubber component. Descriptions of the proportion of these additives with respect to the rubber component are the same as that of the second compression rubber layer.

(Tension Member)

Tension members contained in the tension member layer are generally cords (twisted cords) arranged at a predetermined interval in the belt width direction. The cords are arranged so as to extend in the longitudinal direction of the belt, and generally arranged so as to extend in parallel at a predetermined pitch in parallel with the longitudinal direction of the belt. In the case where the tension member is embedded in the adhesion rubber layer, a part thereof may be embedded in the adhesion rubber layer, and preferred is a form in which the cord is embedded in the adhesion rubber layer (a form in which the entire cord is completely embedded in the adhesion rubber layer) from the viewpoint of improving durability. The tension member is preferably a cord.

As fibers constituting the cord, use can be widely made of, for example: synthetic fibers such as polyolefin fibers (a polyethylene fiber, a polypropylene fiber, etc.), polyamide fibers (a polyamide 6 fiber, a polyamide 66 fiber, a polyamide 46 fiber, an aramid fiber, etc.), polyester fibers (polyalkylene arylate fibers) (poly $C_{2-4}$ alkylene-$C_{6-14}$ arylate fibers such as a polyethylene terephthalate (PET) fiber and a polyethylene naphthalate (PEN) fiber, etc.), vinylon fibers, polyvinyl alcohol fibers, and polyparaphenylene benzobisoxazole (PBO) fibers; natural fibers such as cotton, hemp and wool; inorganic fibers such as carbon fibers; and the like. These fibers can be used alone or in combination of two or more thereof.

Among these fibers, from the viewpoint of a high modulus, synthetic fibers such as polyester fibers (polyalkylene arylate fibers) containing, as a main constituent unit, $C_{2-4}$ alkylene-$C_{6-10}$ arylates, such as ethylene terephthalate and ethylene-2,6-naphthalate and polyamide fibers (an aramid fiber, etc.), and inorganic fibers such as a carbon fiber are widely used, and preferred are polyester fibers (particularly a polyethylene terephthalate fiber and a polyethylene naphthalate fiber) and polyamide fibers (particularly an aramid fiber).

The fibers may be multifilament yarns. The fineness of the multifilament yarn may be about, for example, from 2,000 to 10,000 denier (particularly 4,000 to 8,000 denier). The multifilament yarn may include about, for example, from 100 to 5,000 monofilament yarns, preferably from 500 to 4,000 monofilament yarns, and more preferably from 1,000 to 3,000 monofilament yarns.

As the cord, a twisted cord using multifilament yarns (e.g., plied twist, single twist, and rung twist) can be generally used. The average wire diameter of the cord (fiber diameter of the twisted cord) may be about, for example, from 0.5 mm to 3 mm, preferably from 0.6 mm to 2.5 mm, and more preferably from 0.7 mm to 2 mm.

In the case where the cord is embedded in the adhesion rubber layer, the cord may be subjected to a surface treatment in order to improve the adhesiveness with the vulcanized rubber composition forming the adhesion rubber layer. Examples of the surface treatment agent include the surface treatment agents exemplified as the surface treatment agent for the short fibers of the first compression rubber layer. These surface treatment agents may be used alone or in combination of two or more thereof, and the cord may be sequentially treated with the same or different surface treatment agents for a plurality of times. The cord is preferably subjected to at least an adhesion treatment with an RFL liquid.

[Outside Cloth]

The outside cloth (cover cloth) is formed of a common cloth. Examples of the cloth include cloth materials such as woven cloths, knitted cloths (weft knitted cloths and warp knitted cloths), and non-woven cloths, and the like. Among these, preferred are woven cloths woven in the form of plain weave, twill weave, satin weave, or the like, woven cloths woven at wide angles where the crossing angle between the warp and the weft is more than 900 and 1200 or less, and knitted cloths. Particularly preferred are woven cloths widely used as cover cloths for power transmission belts for use in general industry machinery and agricultural machinery (a plain woven cloth in which the crossing angle of the warp and the weft is a right angle, and a plain woven cloth in which the crossing angle of the warp and the weft is a wide angle of more than 900 and 1200 or less (wide-angle fabric)). Furthermore, in an application requiring durability, a wide-angle fabric may be used.

As fibers constituting the cloth, use can be widely made of, for example: synthetic fibers such as polyolefin fibers (a polyethylene fiber, a polypropylene fiber, etc.), polyamide fibers (a polyamide 6 fiber, a polyamide 66 fiber, a polyamide 46 fiber, an aramid fiber, etc.), polyester fibers (a polyalkylene arylate fiber, etc.), vinyl alcohol fibers (a polyvinyl alcohol fiber, an ethylene-vinyl alcohol copolymer fiber, a vinylon fiber, etc.), and polyparaphenylene benzobisoxazole (PBO) fibers; natural fibers such as cellulosic fibers (a cellulose fiber and a fiber of a cellulose derivative), and wool; and inorganic fibers such as a carbon fiber. These fibers may be a single yarn used alone, or may be a blended yarn in which two or more kinds are combined.

Among these fibers, a blended yarn of a polyester fiber and a cellulosic fiber is preferred from the viewpoint of excellent mechanical properties and economical efficiency.

The polyester fiber may be a polyalkylene arylate fiber. Examples of the polyalkylene arylate fiber include poly $C_{2-4}$ alkylene-$C_{8-14}$ arylate fibers such as a polyethylene terephthalate (PET) fiber and a polyethylene naphthalate (PEN) fiber, and the like.

The cellulosic fibers include cellulose fibers (cellulose fibers derived from plants, animals, bacteria, etc.) and fibers of cellulose derivatives. Examples of the cellulose fibers include: natural-plant-derived cellulose fibers (pulp fibers) such as wood pulp (softwood pulp, hardwood pulp, etc.), bamboo fibers, sugar cane fibers, seed hair fibers (cotton fiber (cotton linter), kapok, etc.), and gin skin fibers (linen, kozo, mitsumata, etc.), leaf fibers (Manila hemp, New Zealand hemp, etc.); animal-derived cellulose fibers such as ascidian cellulose; bacterial cellulose fibers; algae celluloses; and the like. Examples of the fibers of cellulose derivatives include cellulose ester fibers, regenerated cellulose fibers (rayon, cupra, lyocell, etc.), and the like.

The mass ratio of the polyester fiber to the cellulosic fiber, that is, the former/the latter is about, for example, from 90/10 to 10/90, preferably from 80/20 to 20/80, and more preferably from 70/30 to 30/70 (particularly 60/40 to 40/60).

The average fineness of the fibers constituting the cloth is about, for example, from 5 to 30 count, preferably from 10 to 25 count, and more preferably from 10 to 20 count.

The basis weight amount of the cloth (raw material cloth) is about, for example, from 100 g/m$^2$ to 500 g/m$^2$, preferably from 200 g/m$^2$ to 400 g/m$^2$, and more preferably from 250 g/m$^2$ to 350 g/m$^2$.

In the case where the cloth (raw material cloth) is a woven cloth, the yarn density (density of warp and weft) of the cloth is about, for example, from 60 to 100 yarns per 50 mm, preferably from 70 to 90 yarns per 50 mm, and more preferably from 75 to 85 yarns per 50 mm.

The outside cloth may be a single layer or multiple layers (e.g., about from 2 to 5 layers, preferably from 2 to 4 layers, and more preferably from 2 to 3 layers), and a single layer (1 ply) or a double layer (2 plies) is preferred from the viewpoint of productivity and the like.

The outside cloth may be a cloth to which a rubber component is adhered in order to improve the adhesiveness with the belt body. The outside cloth to which a rubber component is adhered may be a cloth obtained by performing, for example, an adhesion treatment such as a treatment of soaking (immersing) a cloth in a rubber paste prepared by dissolving a rubber composition in a solvent, or a treatment of frictioning (rubbing) a cloth with a solid rubber composition. The adhesion treatment may be performed on at least one surface of the cloth, and it is preferable to treat at least the surface in contact with the belt body.

As a rubber component constituting the rubber composition adhered to the outside cloth, the rubber components exemplified as the rubber component (A) of the first compression rubber layer can be used, and descriptions of preferred forms are also the same as those of the rubber component (A) of the first compression rubber layer.

The rubber composition adhered to the outside cloth may further contain a filler in addition to the rubber component. As the filler, the fillers exemplified as the filler (C) of the first compression rubber layer can be used, and descriptions of preferred forms and the proportion of carbon black in the filler are the same as those of the filler (C) of the first compression rubber layer.

In the rubber composition adhered to the outside cloth, the proportion of the filler (particularly carbon black) is about, for example, from 5 to 80 parts by mass, preferably from 10 to 75 parts by mass, and more preferably from 30 to 70 parts by mass (particularly 40 to 60 parts by mass), with respect to 100 parts by mass of the rubber component.

The rubber composition adhered to the outside cloth may further contain a plasticizer in addition to the rubber component. As the plasticizer, the plasticizers exemplified as the plasticizer of the second compression rubber layer can be used, and descriptions of preferred forms are the same as those of the plasticizer of the second compression rubber layer.

In the rubber composition adhered to the outside cloth, the proportion of the plasticizer is about, for example, from 3 to 50 parts by mass, preferably from 5 to 40 parts by mass, and more preferably from 10 to 30 parts by mass (particularly 15 to 25 parts by mass), with respect to 100 parts by mass of the rubber component.

The rubber composition adhered to the outside cloth may further contain short fibers and other additives in addition to the rubber component. As the short fibers, the short fibers exemplified as the short fibers (B) of the first compression rubber layer can be used, and as the other additives, the additives exemplified as the other additives (D) of the first compression rubber layer can be used. Among these, the rubber composition adhered to the outside cloth preferably contains a vulcanizing agent or cross-linking agent, a vulcanization accelerator, a processing agent or processing aid, and an anti-aging agent in addition to the rubber component. Descriptions of the proportion of these additives with respect to the rubber component are the same as that of the second compression rubber layer.

The coefficient of friction of the outside cloth, which is the power transmission surface, is about, for example, from 0.9 to 1, preferably from 0.91 to 0.96, and more preferably from 0.92 to 0.95. In the present description and claims, the coefficient of friction can be measured by the method described in Examples to be described later.

The average thickness of the outside cloth (average thickness of each layer in the case of multiple layers) is about, for example, from 0.4 mm to 2 mm, preferably from 0.5 mm to 1.4 mm, and more preferably from 0.6 mm to 1.2 mm. In the case where the thickness of the outside cloth is too small, the abrasion resistance may be lowered, and in the case where the thickness is too large, the bending resistance of the belt may be lowered.

[Reinforcing Cloth Layer]

Each wrapped V-belt portion may further include a reinforcing cloth layer between the inner peripheral surface (surface at the inner peripheral side) of the compression rubber layer and the outside cloth. FIG. 3 illustrates an example of the wrapped V-belt portion provided with a reinforcing cloth layer. In this example, a wrapped V-belt portion 11 includes, similar to the wrapped V-belt portion in FIG. 2, an tension rubber layer 12, an adhesion rubber layer 14 embedded with tension members (cords) 13, a first compression rubber layer 15a, and a second compression rubber layer 15b, and, unlike the wrapped V-belt portion in FIG. 2, has a reinforcing cloth layer 17 interposed between the second compression rubber layer 15b and an outside cloth 16.

The reinforcing cloth layer is also formed of a commonly used cloth, similar to the outside cloth. As the cloth, the cloths exemplified as the cloth for the outside cloth can be used, and descriptions of preferred forms are the same as those of the outside cloth.

The reinforcing cloth layer may be a cloth to which a rubber component is adhered in order to improve the adhesiveness with the compression rubber layer and the outside cloth. The cloth to which a rubber component is adhered may be a cloth obtained by performing, for example, an adhesion treatment such as a treatment of soaking (immersing) a cloth in a rubber paste prepared by dissolving a rubber composition in a solvent, or a treatment of frictioning (rubbing) a cloth with a solid rubber composition. As the rubber composition, the rubber compositions exemplified as the rubber compositions for the outside cloth can be used, and preferred forms are the same as those of the outside cloth. The adhesion treatment may be performed on at least one surface of the cloth, descriptions of preferably at least the surface in contact with the compression rubber layer, and particularly preferably both surfaces.

The average thickness of the reinforcing cloth layer is about, for example, from 0.4 mm to 2 mm, preferably from 0.5 mm to 1.4 mm, and more preferably from 0.6 mm to 1.2 mm. In the case where the thickness of the reinforcing cloth layer is too small, the effect of improving the abrasion resistance may be lowered, and in the case where the thickness is too large, the bending resistance of the belt may be lowered.

[Tie Band]

The tie band (joining member) for coupling the wrapped V-belt portions is also formed of a commonly used cloth, similar to the outside cloth and the reinforcing cloth layer. As the cloth, the cloths exemplified as the cloth for the outside cloth can be used, and descriptions of preferred forms are the same as those of the outside cloth.

The tie band may be a cloth to which a rubber component is adhered in order to improve the adhesiveness with the outside cloth of the wrapped V-belt portion. The cloth to which a rubber component is adhered may be a cloth obtained by performing, for example, an adhesion treatment such as a treatment of soaking (immersing) a cloth in a rubber paste prepared by dissolving a rubber composition in a solvent, or a treatment of frictioning (rubbing) a cloth with a solid rubber composition. As the rubber composition, the rubber compositions exemplified as the rubber compositions for the outside cloth can be used, and descriptions of preferred forms are the same as those of the outside cloth. The adhesion treatment may be performed on at least one surface of the cloth, preferably at least the surface in contact with the compression rubber layer, and particularly preferably both surfaces.

The average thickness of the tie band is about, for example, from 0.4 mm to 2 mm, preferably from 0.5 mm to 1.4 mm, and more preferably from 0.6 mm to 1.2 mm. In the case where the thickness of the tie band is too small, the effect of improving the abrasion resistance may be lowered, and in the case where the thickness is too large, the bending resistance of the belt may be lowered.

[Method for Producing Wrapped Joined V-Belt]

The wrapped joined V-belt according to the present invention can be obtained thorough steps of producing an unvulcanized wrapped V-belt portion (belt body portions) by a common method and then coupling a plurality of the obtained unvulcanized wrapped V-belt portions via a tie band.

Examples of the method for producing the unvulcanized wrapped V-belt portion include methods described in JP-A H06-137381 and WO 2015/104778 pamphlet, and the like. Specifically, the unvulcanized wrapped V-belt portion can be obtained through: a winding step of cutting a laminate including a cloth for reinforcing cloth subjected to an adhesion treatment and an unvulcanized second compression rubber layer sheet and a first compression rubber layer sheet obtained by a rolling treatment, setting the cut laminate on a mantle, winding an unvulcanized adhesion rubber layer sheet around the first compression rubber layer sheet, then winding a tension member on the wound adhesion rubber layer sheet, and then winding an unvulcanized tension rubber layer sheet on the wound tension member; a cutting step of cutting (ring cutting) the obtained annular laminate on the mantle; a skiving step of bridging the cut annular laminate over a pair of pulleys and cutting the laminate into a V shape under rotation; and a covering treatment of covering the periphery of the obtained unvulcanized belt body with an outside cloth precursor.

A step of coupling a plurality of unvulcanized wrapped V-belt portions via a tie band will be described with reference to FIG. 4. A plurality of unvulcanized wrapped V-belt portions 21 are fitted into groove portions each having an inverted trapezoidal cross section, formed in a cylindrical or annular lower vulcanization mold 23, and then a tie band 22 is set onto a radially outer portion thereof. In setting the tie band, the tie band 22 is wound along the circumferential direction around the plurality of the unvulcanized wrapped V-belt portions arranged in the width direction, so that the tie band 22 is set on the plurality of the unvulcanized wrapped V-belt portions 21. The tie band 22 and the plurality of the unvulcanized wrapped V-belt portions 21 set as described above are sandwiched between an upper vulcanization mold 24 and the lower vulcanization mold 23 and subjected to a vulcanization step of being vulcanized while being pressurized. With the vulcanization step, a vulcanization sleeve is formed in which the plurality of wrapped V-belt portions are coupled and joined together via the tie band 22. The vulcanization sleeve thus formed is cut into a predetermined width, thereby forming a wrapped joined V-belt having a predetermined number of wrapped V-belt portions.

In the vulcanization step, the vulcanization temperature can be selected depending on the type of the rubber component, and is about, for example, from 120° C. to 200° C., and preferably from 150° C. to 180° C. In each rubber layer sheet containing short fibers, the short fibers can be arranged (orientated) in the rolling direction by a method such as a rolling treatment with a calender roll.

The tie band and the unvulcanized wrapped V-belt portions are joined to each other by an adhesive component adhered to the tie band or the outside cloth by, for example, an adhesion treatment. For example, in the case where a cloth obtained by performing a frictioning (rubbing) treatment with a solid rubber composition is used as the tie band, the tie band and the unvulcanized wrapped V-belt portions are joined to each other by a vulcanization reaction of the friction rubber composition. That is, a step of stetting the tie band onto the unvulcanized wrapped V-belt portions includes an unvulcanized belt joining step of joining a plurality of unvulcanized wrapped V-belt portions to each other via the tie band as a coupling portion. The unvulcanized belt joining step is not limited to this method, and the tie band may be configured by winding a plurality of layers of tie band rubber sheets.

Examples

Hereinafter, the present invention will be described in more detail based on Examples, but the present invention is not limited to these Examples. The raw materials used for the rubber composition, the method for preparing the rubber composition, the fiber material used, the measurement method or evaluation method for each physical property, and the like are illustrated below.

[Raw Materials Used for Rubber Composition]

Chloroprene rubber: "PM-40" manufactured by Denka Company Limited.

Magnesium oxide: "Kyowamag 30" manufactured by Kyowa Chemical Industry Co., Ltd.

Stearic acid: "STEARIC ACID CAMELLIA" manufactured by NOF CORPORATION

Anti-aging agent: "Nonflex OD-3" manufactured by Seiko Chemical Co., Ltd.

Carbon black: "SEAST 3" manufactured by Tokai Carbon Co., Ltd.

Silica: "ULTRASIL (registered trademark) VN3" manufactured by Evonik Japan Ltd., BET specific surface area: 175 m²/g Plasticizer: "RS-700" manufactured by ADEKA Corporation Vulcanization accelerator: "NOCCELER TT" manufactured by OUCHI SHINKO CHEMICAL INDUSTRIAL CO., LTD.

Zinc oxide: "zinc oxide Type III" manufactured by SEIDO CHEMICAL INDUSTRY CO., LTD.

Naphthenic oil: "NS-900" manufactured by Idemitsu Kosan Co., Ltd.

N,N'-m-phenylenedimaleimide: "VULNOC PM" manufactured by OUCHI SHINKO CHEMICAL INDUSTRIAL CO., LTD.

Aramid short fibers: "Conex staple fiber" manufactured by Teijin Limited, average fiber length: 3 mm, average fiber diameter: 14 µm, short fibers with an adhesion rate of 6% by mass of the solid content, subjected to an adhesion treatment with a RFL liquid (2.6 parts of resorcin, 1.4 parts of 37% formalin, 17.2 parts of vinyl pyridine-styrene-butadiene copolymer latex (manufactured by Nippon Zeon Corporation), and 78.8 parts of water) Polyester short fibers: "Tetoron" manufactured by Teijin Limited, average short fiber length: 3 mm.

[Cord]

Twisted cords of aramid fibers, average wire diameter: 1.985 mm.

[Rubber Composition for Adhesion Rubber Layer and Friction Rubber]

A rubber composition A having the composition shown in Table 1 was kneaded with a Banbury mixer, and the kneaded rubber was passed through a calender roll to prepare an unvulcanized rolled rubber sheet having a predetermined thickness, so as to prepare an adhesion rubber layer sheet. In addition, a rubber composition B shown in Table 1 was kneaded with a Banbury mixer to prepare a bulk unvulcanized rubber composition for friction. Furthermore, Table 1 also shows the results of measuring the hardness and the tensile elastic modulus of vulcanizates of the respective rubber compositions.

TABLE 1

| | | Adhesion rubber layer Rubber composition A | Friction rubber Rubber composition B |
|---|---|---|---|
| Composition (part by mass) | Chloroprene rubber | 100 | 100 |
| | Magnesium oxide | 4 | 4 |
| | Stearic acid | 1 | 1 |
| | Anti-aging agent | 4 | 4 |
| | Carbon black | 30 | 50 |
| | Silica | 20 | 0 |
| | Plasticizer | 5 | 20 |
| | Vulcanization accelerator | 1 | 1 |
| | Zinc oxide | 5 | 5 |
| Properties of vulcanized rubber | Hardness Hs | 76 | 54 |
| | Tensile elastic modulus (MPa) | 14.5 | 12.3 |

[Rubber Compositions for First Compression Rubber Layer, Second Compression Rubber Layer, and Tension Rubber Layer]

Rubber compositions C to L having respective compositions shown in Tables 2 and 3 were kneaded with a Banbury mixer, and the kneaded rubbers were passed through a calender roll to prepare unvulcanized rolled rubber sheets each having a predetermined thickness, so as to prepare first compression rubber layer sheets, second compression rubber layers sheet and tension rubber layer sheets (Table 3 shows only the second compression rubber layer sheets). Furthermore, Tables 2 and 3 also show the results of measuring the hardness and the tensile elastic modulus of vulcanizates of the respective rubber compositions. Only for Comparative Example 1, the first compression rubber layer sheet and the tension rubber layer sheet were prepared in the same method by using the rubber composition J for producing the second compression rubber layer sheet as the rubber compositions for the first compression rubber layer and the tension rubber layer.

TABLE 2

| | | First compression rubber layer, second compression rubber layer, and tension rubber layer | | | |
|---|---|---|---|---|---|
| | | Rubber composition C | Rubber composition D | Rubber composition E | Rubber composition F |
| Composition (part by mass) | Chloroprene rubber | 100 | 100 | 100 | 100 |
| | Aramid short fibers | 10 | 20 | 20 | 25 |
| | Polyester short fibers | 10 | 0 | 0 | 0 |
| | Naphthenic oil | 5 | 5 | 5 | 5 |
| | Magnesium oxide | 4 | 4 | 4 | 4 |
| | Carbon black | 30 | 40 | 50 | 50 |
| | Anti-aging agent | 4 | 4 | 4 | 4 |
| | Zinc oxide | 5 | 5 | 5 | 5 |
| | N,N'-m-phenylenedimaleimide | 3 | 3 | 3 | 3 |
| | Stearic acid | 2 | 2 | 2 | 2 |
| | Sulfur | 0.5 | 0.5 | 0.5 | 0.5 |
| Properties of vulcanized rubber | Hardness Hs | 85 | 90 | 93 | 95 |
| | Tensile elastic modulus (MPa) (in grain direction) | 16.5 | 26.5 | 30.5 | 42.5 |

TABLE 3

| | | Second compression rubber layer | | | | | |
|---|---|---|---|---|---|---|---|
| | | Rubber composition G | Rubber composition H | Rubber composition I | Rubber composition J | Rubber composition K | Rubber composition L |
| Composition (part by mass) | Chloroprene rubber | 100 | 100 | 100 | 100 | 100 | 100 |
| | Magnesium oxide | 4 | 4 | 4 | 4 | 4 | 4 |
| | Stearic acid | 1 | 1 | 1 | 1 | 1 | 1 |
| | Anti-aging agent | 4 | 4 | 4 | 4 | 4 | 4 |
| | Carbon black | 18 | 22 | 26 | 30 | 34 | 38 |
| | Plasticizer | 5 | 5 | 5 | 5 | 5 | 5 |
| | Vulcanization accelerator | 1 | 1 | 1 | 1 | 1 | 1 |
| | Zinc oxide | 5 | 5 | 5 | 5 | 5 | 5 |
| Properties of vulcanized rubber | Hardness Hs | 70 | 72 | 74 | 76 | 78 | 80 |
| | Tensile elastic modulus (MPa) | 14.5 | 15.0 | 15.5 | 15.5 | 15.5 | 16.0 |

[Rubber Hardness Hs of Vulcanized Rubber]

Each rubber layer sheet was press-vulcanized at a temperature of 160° C. for 30 minutes to prepare a vulcanized rubber sheet (100 mm×100 mm×2 mm thickness). A laminate obtained by laminating three vulcanized rubber sheets was used as a sample, and the hardness was measured by using a durometer A type hardness tester in accordance with JIS K6253 (2012). For the bulk unvulcanized rubber composition B for friction, a test piece was sampled from the bulk rubber and passed through a calender roll to prepare an unvulcanized rolled rubber sheet having a predetermined thickness.

[Tensile Elastic Modulus (Modulus) of Vulcanized Rubber]

The vulcanized rubber sheet prepared for measuring the rubber hardness Hs of the vulcanized rubber was used as a sample, and a test piece punched out in a dumbbell shape was prepared in accordance with JIS K6251 (1993). In the sample containing the short fibers, the test piece was punched out in a dumbbell shape such that the arrangement direction (grain direction) of the short fibers becomes the tensile direction. Then, both ends of the test piece were gripped by a chuck (grasping tool), and when the test piece was tensioned at a rate of 500 mm/min, the tensile stress (tensile elastic modulus) until the test piece was cut was measured.

[Woven Cloths for Outside Cloth, Reinforcing Cloth Layer, and Tie Band]

A woven cloth (120° wide-angle weave, fineness: 20 count for warp and 20 count for weft, yarn density of warp and weft: 75 yarns per 50 mm, basis weight amount: 280 g/m²) of a blended yarn formed of a polyester fiber and cotton (polyester fiber/cotton=50/50 in mass ratio) and the rubber composition B shown in Table 1 were used. A friction treatment was performed in such a manner that the rubber composition B and the woven cloth were simultaneously passed between rolls having different surface speeds in a calender roll so as to rub the rubber composition B into textures of the woven cloth (each side of the woven fabric was treated once), to thereby prepare a reinforcing cloth precursor and an outside cloth precursor.

[Coefficient of Friction of Belt]

For the coefficient of friction of the belt, as illustrated in FIG. 5, one end portion of a cut belt 31 was fixed to a load cell 32, a load 33 of 3 kgf was placed on the other end portion, and the belt 31 was wound around a pulley 34 with a belt winding angle around the pulley 34 being 45°. Then, the belt 31 on the load cell 32 side was tensioned at a rate of 30 mm/s for about 15 seconds, and the average coefficient of friction of the frictional power transmission surface was measured. During the measurement, the pulley 34 was fixed so as not to rotate.

[Belt Running Test]

The wrapped joined V-belts obtained in Examples and Comparative Examples were used, and the belts were ran under conditions shown in Table 5 by using a multi-shaft layout (maximum span length: 2066.1 mm between shafts of Dr1 and Dn2) tester, as illustrated in FIG. 6, equipped with a pulley layout including a drive pulley (Dr1), driven pulleys (Dn2 and Dn3) and a tension pulley (Ten4) shown in Table 4, and the time until when the belt was broken was evaluated according to the following criteria. The load during the running is distributed in six ways shown in Table 6. For example, the case of condition (3) indicates that a load state of 190 kW on the driven pulley Dn2 and 90 kW on the driven pulley Dn3, that is, 280 kW in total, accounts for 40% of the entire running time.

(Running Evaluation)

A: the running was completed in 240 hours, and no abnormalities such as cracks or peeling were observed.

B: the running was completed in 240 hours, and some cracks and peeling were observed (performance was not influenced).

C-1: since the belt is hard, there was no buckling deformation, but since the belt is hard to bend, cracks were generated in the compression rubber layer from the inner peripheral surface of the V-belt.

C-2: peeling between the tie band and the V-belt occurred due to buckling deformation.

D: due to the buckling deformation, cracks generated on the V side surface (around the side of the cord) were further spread, and the cord peeling and peeling between the tie band and the V-belt occurred.

[Table 4]

TABLE 4

| Pulley | Coordinate (mm) | | Pulley diameter (mm) |
|---|---|---|---|
| | X | Y | |
| Dr1 | 2066.1 | −92.0 | 287.0 |
| Dn2 | 0.0 | 0.0 | 507.0 |
| Dn3 | 921.5 | 426.9 | 270.0 |
| Ten4 | 1080.0 | 48.9 | 225.0 |

[Table 5]

TABLE 5

| Belt type/size | RMA B type/238 inches |
|---|---|
| Number coupled | 2, 3, 6 |
| Rotation speed | 2,000 rpm |
| Running time | 240 Hr |

[Table 6]

TABLE 6

| | Load (kW) | | | Frequency |
|---|---|---|---|---|
| | Total | Pulley 2 | Pulley 3 | % |
| Condition (1) | 340 | 230 | 110 | 1 |
| Condition (2) | 320 | 220 | 100 | 20 |
| Condition (3) | 280 | 190 | 90 | 40 |
| Condition (4) | 240 | 165 | 75 | 20 |
| Condition (5) | 200 | 140 | 60 | 15 |
| Condition (6) | 100 | 70 | 30 | 4 |

Examples 1 and 21 and Comparative Examples 1 to 4

A laminate composed of the reinforcing cloth precursor, the second compression rubber layer sheet shown in Tables 7 to 10, and the first compression rubber layer sheet shown in Tables 7 to 10 was cut and placed on the outer peripheral surface of a cylindrical drum, and then the adhesion rubber layer sheet, the cord, and the tension rubber layer sheet shown in Tables 7 to 10 were sequentially laminated and adhered thereto, to form a cylindrical unvulcanized sleeve in which the reinforcing cloth precursor, the unvulcanized rubber layers, and the cord were laminated. The obtained unvulcanized sleeve was circumferentially cut while being disposed on the outer periphery of the cylindrical drum to form an annular unvulcanized rubber belt. In the case where the first compression rubber layer, the second compression rubber layer and the tension rubber layer contained short fibers, the short fibers were arranged in the belt width direction.

Next, the unvulcanized rubber belt was taken out from the drum, and both side surfaces of the unvulcanized rubber belt were cut (skived) at a predetermined angle to form the cross section of the unvulcanized rubber belt into a V shaped cross section. A cover wrapping treatment was performed such that the outer periphery of the unvulcanized rubber belt having a V-shaped cross section (the belt composed of the tension rubber layer 12, the adhesion rubber layer 14 embedded with the tension member (cords) 13, the first compression rubber layer 15*a*, the second compression rubber layer 15*b*, and the reinforcing cloth layer 17) was covered with the outside cloth precursor, as illustrated in FIG. 3, to thereby obtain an unvulcanized wrapped V-belt portion.

The obtained six unvulcanized wrapped V-belt portions were fitted into annular groove portions formed in a lower vulcanization mold, and then the tie band precursor was set onto the radially outer portion thereof. In setting the tie band, the tie band precursor was wound along the circumferential direction around the six unvulcanized wrapped V-belt portions arranged in the width direction, and thereby the tie band precursor was set on the six unvulcanized wrapped V-belt portions. The tie band precursor and the six unvulcanized wrapped V-belt portions set as described above were sandwiched between an upper vulcanization mold and the lower vulcanization mold and vulcanized at a vulcanization temperature of 160° C. while being pressurized to 1.2 MPa, so as to obtain a vulcanized belt in which six wrapped V-belt portions (RMA type B, cross-sectional dimensions: width 16.5 mm×thickness 11 mm, belt length: 238 inches, average thickness of outside cloth: 1.2 mm) were coupled and joined together via a tie band. The obtained vulcanized belt was cut to produce a wrapped joined V-belt having three wrapped V-belt portions. The wrapped joined belt obtained in Example 1 was cut into three wrapped V-belt portions, and the coefficient of friction of each wrapped V-belt was measured and found to be 0.93. In Examples 8 and 20, the number of wrapped V-belt portions in the wrapped joined V-belts of Examples 6 and 5 was changed to two, respectively. In Examples 9 and 21, the number of wrapped V-belt portions in the wrapped joined V-belts of Examples 6 and 5 was changed to six, respectively.

Tables 7 to 10 show the results of running evaluation of the obtained wrapped joined V-belts.

TABLE 7

|  |  | Comparative Example | | Example | | | | | | | Comparative Example | | Example | |
| --- | --- | --- | --- | --- | --- | --- | --- | --- | --- | --- | --- | --- | --- | --- |
|  |  | 1 | 2 | 1 | 2 | 3 | 4 | 5 | 6 | 7 | 3 | 4 | 8 | 9 |
| Number coupled |  | | | | | | 3 | | | | | | 2 | 6 |
| Tension rubber layer | Rubber composition | J | C | C | C | C | D | D | E | D | F | F | E | E |
|  | Hardness (Hs1) (°) | 76 | 85 | 85 | 85 | 85 | 90 | 90 | 93 | 90 | 95 | 95 | 93 | 93 |
| First compression rubber layer | Rubber composition | J | C | D | E | F | D | E | E | F | F | D | E | E |
|  | Hardness (Hs2) (°) | 76 | 85 | 90 | 93 | 95 | 90 | 93 | 93 | 95 | 95 | 90 | 93 | 93 |
| Hardness difference (Hs2 − Hs1) |  | 0 | 0 | 5 | 8 | 10 | 0 | 3 | 0 | 5 | 0 | −5 | 0 | 0 |
| Second compression rubber layer, hardness (Hs3) (°) |  | 76 | 76 | 76 | 76 | 76 | 76 | 76 | 76 | 76 | 76 | 76 | 76 | 76 |
| Hardness difference (Hs2 − Hs3) (°) |  | 0 | 9 | 14 | 17 | 19 | 14 | 17 | 17 | 19 | 19 | 19 | 17 | 17 |
| Tension rubber layer, thickness (mm) |  | 0.8 | 0.8 | 0.8 | 0.8 | 0.8 | 0.8 | 0.8 | 0.8 | 0.8 | 0.8 | 0.8 | 0.8 | 0.8 |
| First compression rubber layer, thickness L2 (mm) |  | 2.6 | 2.6 | 2.6 | 2.6 | 2.6 | 2.6 | 2.6 | 2.6 | 2.6 | 2.6 | 2.6 | 2.6 | 2.6 |
| Compression rubber layer, thickness L1 (mm) |  | 3.6 | 3.6 | 3.6 | 3.6 | 3.6 | 3.6 | 3.6 | 3.6 | 3.6 | 3.6 | 3.6 | 3.6 | 3.6 |
| L2/L1 ratio |  | 72% | 72% | 72% | 72% | 72% | 72% | 72% | 72% | 72% | 72% | 72% | 72% | 72% |
| Running evaluation |  | D | C-2 | B | B | B | A | A | A | B | C-1 | C-1 | A | A |
| Time until breakage (Hr) |  | 72 | 182 | Complete | Complete | Complete | Complete | Complete | Complete | Complete | 191 | 180 | Complete | Complete |

[Table 8]

TABLE 8

|  |  | Example | | | | |
| --- | --- | --- | --- | --- | --- | --- |
|  |  | 10 | 11 | 6 | 12 | 13 |
| Number coupled |  | | | 3 | | |
| Tension rubber layer | Rubber composition | E | E | E | E | E |
|  | Hardness (Hs1) (°) | 93 | 93 | 93 | 93 | 93 |
| First compression rubber layer | Rubber composition | E | E | E | E | E |
|  | Hardness (Hs2) (°) | 93 | 93 | 93 | 93 | 93 |
| Hardness difference (Hs2 − Hs1) |  | 0 | 0 | 0 | 0 | 0 |
| Second compression rubber layer, hardness (Hs3) (°) |  | 76 | 76 | 76 | 76 | 76 |
| Hardness difference (Hs2 − Hs3) (°) |  | 17 | 17 | 17 | 17 | 17 |
| Tension rubber layer, thickness (mm) |  | 0.8 | 0.8 | 0.8 | 0.8 | 0.8 |
| First compression rubber layer, thickness L2 (mm) |  | 1.4 | 1.8 | 2.6 | 3.2 | 3.4 |
| Compression rubber layer, thickness L1 (mm) |  | 3.6 | 3.6 | 3.6 | 3.6 | 3.6 |
| L2/L1 ratio |  | 39% | 50% | 72% | 89% | 94% |
| Running evaluation |  | B | A | A | A | B |
| Time until breakage (Hr) |  | Complete | Complete | Complete | Complete | Complete |

[Table 9]

TABLE 9

|  |  | Example | | | | | | |
| --- | --- | --- | --- | --- | --- | --- | --- | --- |
|  |  | 14 | 15 | 16 | 6 | 17 | 18 | 19 |
| Number coupled |  | | | | 3 | | | |
| Tension rubber layer | Rubber composition | D | D | E | E | E | E | E |
|  | Hardness (Hs1) (°) | 90 | 90 | 93 | 93 | 93 | 93 | 93 |
| First compression rubber layer | Rubber composition | D | D | E | E | E | E | E |
|  | Hardness (Hs2) (°) | 90 | 90 | 93 | 93 | 93 | 93 | 93 |
| Hardness difference (Hs2 − Hs1) |  | 0 | 0 | 0 | 0 | 0 | 0 | 0 |
| Second compression rubber layer | Rubber composition | G | H | I | J | K | L | C |
|  | Hardness (Hs3) (°) | 70 | 72 | 74 | 76 | 78 | 80 | 85 |

TABLE 9-continued

|  | Example | | | | | | |
| --- | --- | --- | --- | --- | --- | --- | --- |
|  | 14 | 15 | 16 | 6 | 17 | 18 | 19 |
| Hardness difference (Hs2 − Hs3) (°) | 20 | 18 | 19 | 17 | 15 | 13 | 8 |
| Tension rubber layer, thickness (mm) | 0.8 | 0.8 | 0.8 | 0.8 | 0.8 | 0.8 | 0.8 |
| First compression rubber layer, thickness L2 (mm) | 2.6 | 2.6 | 2.6 | 2.6 | 2.6 | 2.6 | 2.6 |
| Compression rubber layer, thickness L1 (mm) | 3.6 | 3.6 | 3.6 | 3.6 | 3.6 | 3.6 | 3.6 |
| L2/L1 ratio | 72% | 72% | 72% | 72% | 72% | 72% | 72% |
| Running evaluation | C-2 | B | A | A | A | B | C-1 |
| Time until breakage (Hr) | 180 | Complete | Complete | Com-plete | Complete | Complete | 191 |

[Table 10]

TABLE 10

|  |  | Example | | | |
| --- | --- | --- | --- | --- | --- |
|  |  | 8 | 20 | 9 | 21 |
| Number coupled |  | 2 | | 6 | |
| Tension rubber layer | Rubber composition | E | D | E | D |
|  | Hardness (Hs1) (°) | 93 | 90 | 93 | 90 |
| First compression rubber layer | Rubber composition | E | E | E | E |
|  | Hardness (Hs2) (°) | 93 | 93 | 93 | 93 |
| Hardness difference (Hs2 − Hs1) |  | 0 | 3 | 0 | 3 |
| Second compression rubber layer, hardness (Hs3) (°) |  | 76 | 76 | 76 | 76 |
| Hardness difference (Hs2 − Hs3) (°) |  | 17 | 17 | 17 | 17 |
| Tension rubber layer, thickness (mm) |  | 0.8 | 0.8 | 0.8 | 0.8 |
| First compression rubber layer, thickness L2 (mm) |  | 2.6 | 2.6 | 2.6 | 2.6 |
| Compression rubber layer, thickness L1 (mm) |  | 3.6 | 3.6 | 3.6 | 3.6 |
| L2/L1 ratio |  | 72% | 72% | 72% | 72% |
| Running evaluation |  | A | A | A | A |
| Time until breakage (Hr) |  | Complete | Complete | Complete | Complete |

In Table 7, the difference between the rubber hardness Hs1 of the tension rubber layer and the rubber hardness Hs2 of the first compression rubber layer is varied and studied. As can be seen from the results in Table 7, in Comparative Examples, the breakage phenomenon as described above occurred before the termination time of 240 Hr, but in Examples 1 to 9, no breakage was observed before the termination time. Among Examples 1 to 9, the cases where Hs2-Hs1 being in the range of from 0 to 3 were particularly good since no abnormalities such as cracks and peeling were observed.

In Table 8, the ratio of the thickness L2 of the first compression rubber layer to the thickness L1 of the compression rubber layer is varied and studied. As can be seen from the results in Table 8, the cases where the L2/L1 ratio being in the range of from 50% to 89% were particularly good since no abnormalities such as cracks and peeling were observed.

In Table 9, the difference between the rubber hardness Hs2 of the first compression rubber layer and the rubber hardness Hs3 of the second compression rubber layer is varied and studied. As can be seen from the results in Table 9, in the case where Hs2-Hs3 was from 13 to 19, no breakage was observed before the termination time. Among these, the cases where Hs2-Hs3 being in the range of from 15 to 19 and Hs3 being in the range of 74 to 78 were particularly good since no abnormalities such as cracks and peeling were observed.

In Table 10, for Examples 8 and 9 in which the number of wrapped V-belt portions is two and six, respectively, examples in which Hs2-Hs1 was changed to 3 are studied. Good results were obtained in Examples 20 and 21.

Although the present invention has been described in detail with reference to a specific example, it is obvious to those skilled in the art that various changes and modifications may be made without departing from the gist and the scope of the invention.

This application is based on Japanese Patent Application 2018-119730 filed on Jun. 25, 2018, and Japanese Patent Application 2019-092308 filed on May 15, 2019, contents of which are incorporated by reference herein.

INDUSTRIAL APPLICABILITY

The wrapped joined V-belt according to the present invention can be used for general industrial machinery such as a compressor, a generator and a pump, or agricultural machinery such as a combine harvester, a rice transplanter and a mower, and can be suitably used for a high load machine used in a high load and long span layout because of being excellent in lateral pressure resistance. Examples of such a high load machine include large-scale agricultural machinery used in Europe and the United States, for example, a tiller, a vegetable transplanter, a transplanter, a binder, a combine, a vegetable harvester, a thresher, a bean cutter, a corn harvester, a potato harvester, and a beet harvester.

REFERENCE SIGNS LIST 1, 11 wrapped V-belt portion
2, 12 tension rubber layer
3, 13 tension member
4, 14 tension member layer (adhesion rubber layer)
5a, 15a first compression rubber layer
5b, 15b second compression rubber layer
6, 16 outside cloth
17 reinforcing cloth layer

The invention claimed is:

1. A wrapped joined V-belt, comprising: a plurality of wrapped V-belt portions; and a tie band, wherein outer peripheral surfaces of the wrapped V-belt portions are coupled via the tie band, each of the wrapped V-belt portions comprises a tension member layer comprising a tension member, a tension rubber layer laminated on the tension member layer at a belt outer peripheral side, a compression rubber layer laminated on the tension member layer at a belt inner peripheral side, and an outside cloth covering an entire outer surface of the belt,
  wherein in each of the wrapped V-belt portions, the compression rubber layer comprises a first compression rubber layer laminated at the belt outer peripheral side and a second compression rubber layer laminated at the belt inner peripheral side, and in a V-shaped cross section of the wrapped V-belt portion, a side where a belt width is wide is the belt outer peripheral side, and a side where the belt width is narrow is the belt inner peripheral side,
  the tension rubber layer has a rubber hardness that is higher than a rubber hardness of the second compression rubber layer,
  the first compression rubber layer has a rubber hardness that is higher than the rubber hardness of the tension rubber layer,
  in each of the wrapped V-belt portions, the first compression rubber layer has an average thickness of from 90% to 50% with respect to an average thickness of the entire compression rubber layer, and
  a difference in rubber hardness Hs (JIS A) between the first compression rubber layer and the tension rubber layer is from 3 to 10.

2. The wrapped joined V-belt according to claim 1, wherein in each of the wrapped V-belt portions, the tension rubber layer has a rubber hardness Hs (JIS A) measured in accordance with a spring hardness test (A type) specified in JIS K6253 (2012) in the range of from 85 to 93, the first compression rubber layer has a rubber hardness Hs (JIS A) measured in accordance with the spring hardness test (A type) specified in JIS K6253 (2012) in the range of from 90 to 95, the second compression rubber layer has a rubber hardness Hs (JIS A) measured in accordance with the spring hardness test (A type) specified in JIS K6253 (2012) in the range of from 72 to 78, and a difference in the rubber hardness Hs (JIS A) between the first compression rubber layer and the second compression rubber layer is from 12 to 20.

3. The wrapped joined V-belt according to claim 1, wherein in each of the wrapped V-belt portions, the tension rubber layer has a tensile elastic modulus (modulus) in a belt width direction in accordance with JIS K6251 (1993) being from 25 MPa to 50 MPa, the first compression rubber layer has a tensile elastic modulus (modulus) in the belt width direction in accordance with JIS K6251 (1993) being from 25 MPa to 50 MPa, and the second compression rubber layer has a tensile elastic modulus (modulus) in the belt width direction in accordance with JIS K6251 (1993) being from 12 MPa to 20 MPa.

4. The wrapped joined V-belt according to claim 1, wherein in each of the wrapped V-belt portions, the outside cloth serving as a power transmission surface has a coefficient of friction of from 0.91 to 0.96.

5. The wrapped joined V-belt according to claim 1, further comprising, in each of the wrapped V-belt portions, a reinforcing cloth layer interposed between an inner peripheral surface of the compression rubber layer and the outside cloth.

6. The wrapped joined V-belt according to claim 1, wherein each of the wrapped V-belt portions has a width of an outer peripheral surface of the belt being from 15 mm to 35 mm, and a thickness of from 10 mm to 20 mm.

* * * * *